United States Patent
Johnson et al.

(10) Patent No.: US 7,880,591 B2
(45) Date of Patent: Feb. 1, 2011

(54) CONSUMER ABUSE DETECTION SYSTEM AND METHOD

(75) Inventors: Timothy M. Johnson, San Jose, CA (US); Richard H. M. Dinh, Cupertino, CA (US); Tang Y. Tan, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 304 days.

(21) Appl. No.: 12/024,519

(22) Filed: Feb. 1, 2008

(65) Prior Publication Data

US 2009/0195394 A1    Aug. 6, 2009

(51) Int. Cl.
    *G08B 19/00* (2006.01)
(52) U.S. Cl. ............. 340/321; 340/825.56; 340/825.37; 340/5.3; 340/5.33; 340/438; 340/528
(58) Field of Classification Search ................ 340/521, 340/52, 825.56, 825.37, 526, 5.3, 438
    See application file for complete search history.

(56) References Cited

U.S. PATENT DOCUMENTS

| | | |
|---|---|---|
| 6,185,507 B1 | 2/2001 | Huber et al. |
| 6,501,390 B1 | 12/2002 | Chainer et al. |
| 6,603,319 B1 | 8/2003 | Kasahara et al. |
| 6,683,535 B1 | 1/2004 | Utke |
| 7,039,815 B1 | 5/2006 | Grassl et al. |
| 2004/0178900 A1* | 9/2004 | Berndorfer et al. ....... 340/450.3 |
| 2005/0060070 A1* | 3/2005 | Kapolka et al. ............... 701/29 |
| 2005/0113650 A1* | 5/2005 | Pacione et al. .............. 600/300 |
| 2005/0242971 A1* | 11/2005 | Dryer .................... 340/870.11 |
| 2005/0248438 A1 | 11/2005 | Hughes et al. |
| 2006/0053075 A1* | 3/2006 | Roth et al. ..................... 705/50 |
| 2006/0184379 A1* | 8/2006 | Tan et al. ....................... 705/1 |
| 2007/0043978 A1 | 2/2007 | Cruzado et al. |
| 2007/0139183 A1 | 6/2007 | Kates |

(Continued)

FOREIGN PATENT DOCUMENTS

EP    0969346 A2    5/2000

(Continued)

OTHER PUBLICATIONS

"Mounted Shock Sensor"; U.S. Appl. No. 11/725,008, filed Mar. 15, 2007 (not yet published).

(Continued)

*Primary Examiner*—George A Bugg
*Assistant Examiner*—Ojiako Nwugo
(74) *Attorney, Agent, or Firm*—Fletcher Yoder PC

(57) ABSTRACT

A technique is provided for detecting whether consumer abuse has occurred in an electronic device. In accordance with this technique, a system is provided for detecting the occurrence of a consumer abuse event and storing a record thereof. In one embodiment, the system provides one or more sensors coupled to an abuse detection circuitry for detecting the occurrence of an abuse event. The system may further provide a memory, wherein upon detecting an abuse event, the abuse detection circuitry may store a record of the abuse event into the memory. The system may further provide an interface by which a diagnostic device may access the memory and analyze the abuse event records to determine if an abuse event occurred in the electronic device.

19 Claims, 11 Drawing Sheets

U.S. PATENT DOCUMENTS

| | | |
|---|---|---|
| 2008/0001594 A1 | 1/2008 | Youssef |
| 2008/0204219 A1* | 8/2008 | Cohn et al. .................. 340/506 |
| 2009/0007229 A1 | 1/2009 | Stokes |
| 2010/0148442 A1 | 6/2010 | Walker et al. |

FOREIGN PATENT DOCUMENTS

| | | | |
|---|---|---|---|
| EP | 1089219 | A2 | 4/2001 |
| GB | 2303173 | A | 2/1997 |
| JP | 2000-501871 | A | 2/2000 |
| JP | 2000-075952 | A | 3/2000 |
| JP | 2000-205892 | A | 7/2000 |
| JP | 2001-147860 | A | 5/2001 |
| JP | 2007-015413 | A | 1/2007 |

OTHER PUBLICATIONS

Korean Search Report for related Korean Application No. 10-2010-7019427, search dated Sep. 16, 2010, 7 pgs.

Korean Office Action dated Sep. 30, 2010, for related Korean Patent Application No. 10-2010-7019427 dated Sep. 30, 2010, 4 pgs.

Office Action of related U.S. Appl. No. 12/858,913, mailed Oct. 27, 2010, 16 pgs.

* cited by examiner

CONSUMER ABUSE DETECTION SYSTEM AND METHOD

BACKGROUND

1. Technical Field

The present invention relates generally to electronic devices and, more particularly, to techniques for detecting the occurrence of consumer abuse in electronic devices.

2. Description of the Related Art

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Electronic products purchased by consumers are usually sold with a warranty or return policy accompanying the product in which the vendor and/or manufacturer warrants that the product is free from defects and will remain operable for at least a limited period of time. For example, typical warranty and return policies may specify that in the event a defect is discovered in a product, or that the product becomes inoperable during the warranty period, the manufacturer or vendor will either replace the product or provide repair services to restore the product to an operational state at little or no additional charge to the consumer.

In general, such warranty and return policies are intended only to cover failures and defects relating to the manufacture or design of the product, and typically do not cover product failure that occurs as the result of consumer abuse. In fact, many warranty policies explicitly exclude returns or repair when damage from consumer abuse, whether intentional or unintentional, is the underlying cause of the product failure. For example, consumer abuse may include exposing an electronic device to liquids, extreme temperatures, or excessive shock (e.g., the resulting impact from dropping the device). Consumer abuse may also result from tampering which may include any interaction with the device that is not related to operating the device in a normal manner (e.g., opening the casing or housing of a device and adding, removing, or altering the internal components).

Inevitably, a percentage of products sold will eventually malfunction or become inoperable at some point during the product's lifetime. When this occurs, and if the product is still within the warranty period, the purchasing consumer may elect to return the failing or inoperable device to the vendor at the point of sale or directly to the manufacturer for either service or replacement in accordance with the terms of the warranty agreement.

However, a problem arises when a device has failed due to consumer abuse which may not be readily apparent upon a cursory inspection, but a consumer attempts to return the device for repair or replacement under the warranty. Often, particularly at a point of sale, personnel receiving the returned device may be unqualified or untrained to determine whether or not a device has failed due to manufacturing defects or due to consumer abuse. Thus, personnel at the point of sale may often times exchange the returned product with a working replacement product regardless of the cause of failure in order to avoid potential conflicts with the customer. As a result, it is not uncommon for consumers to receive replacement products or repair services on abused products not covered under the terms of a warranty. Such erroneous replacements or repairs may be costly to the vendor and/or manufacturer of the product.

SUMMARY

Certain aspects of embodiments disclosed herein by way of example are summarized below. It should be understood that these aspects are presented merely to provide the reader with a brief summary of certain forms an invention disclosed and/or claimed herein might take and that these aspects are not intended to limit the scope of any invention disclosed and/or claimed herein. Indeed, any invention disclosed and/or claimed herein may encompass a variety of aspects that may not be set forth below.

The present disclosure generally relates to techniques for determining whether consumer abuse occurred in an electronic device. In accordance with one disclosed embodiment of the invention, an exemplary technique may provide a system for detecting the occurrence of a consumer abuse event and storing a record of the event. In accordance with one aspect of the present invention, the system may include one or more sensors for detecting the occurrence of a consumer abuse event. Consumer abuse may include exposing the electronic device to liquids, extreme temperatures, excessive shock, and may also include tampering with the device in a manner not related to normal operation of the device. In accordance with another aspect of the present invention, the system may further include abuse detection circuitry for receiving the indication of the occurrence of a consumer abuse event from the one or more sensors. In accordance with a further aspect of the present invention, the abuse detection circuitry may generate a record for each consumer abuse event detected, and store the records into a memory. In accordance with yet another aspect of the present invention, the system may include an interface by which a diagnostic device may access the memory to analyze the records and determine whether a consumer abuse event occurred, when the event occurred, and, in some embodiments, what type of abuse event occurred. By providing the capability to quickly and easily detect whether consumer abuse occurred in an electronic device, a vendor or manufacturer diagnosing a returned product may be able to better determine whether or not to initiate a product return under a warranty policy.

In accordance with another disclosed embodiment, the abuse detection circuitry may be configured to disable operation of an electronic device upon detecting the occurrence of a consumer abuse event, for example, by disabling power to the device. Subsequent to disabling operation of the device, the abuse detection circuitry may be further configured to periodically check the sensors to determine whether the detected abuse event is still occurring and to re-enable operation of the device if it is determined that the abuse event is no longer occurring. By disabling operation of the device upon detection of a consumer abuse event, the risks of damage to the device from the abuse event may be reduced.

Various refinements of the features noted above may exist in relation to various aspects of the present invention. Further features may also be incorporated in these various aspects as well. These refinements and additional features may exist individually or in any combination. For instance, various features discussed below in relation to one or more of the illustrated embodiments may be incorporated into any of the above-described aspects of the present invention alone or in any combination. Again, the brief summary presented above is intended only to familiarize the reader with certain aspects and contexts of embodiments of the present invention without limitation to the claimed subject matter.

BRIEF DESCRIPTION OF THE DRAWINGS

These and other features, aspects, and advantages of the present invention will become better understood when the following detailed description of certain exemplary embodiments is read with reference to the accompanying drawings in which like characters represent like parts throughout the drawings, wherein.

DETAILED DESCRIPTION OF SPECIFIC EMBODIMENTS

One or more specific embodiments of the present invention will be described below. These described embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the term "consumer abuse" or the like may encompass one or a combination of any of the above discussed types of consumer abuse (e.g., liquid exposure, extreme temperature exposure, shock exposure, tampering), but certainly should not be construed as being limited to these aforementioned examples. Indeed, it should be appreciated that additional embodiments of the invention, though not necessarily described herein, may be adapted for detecting any type of consumer abuse event or events.

Figure 1:
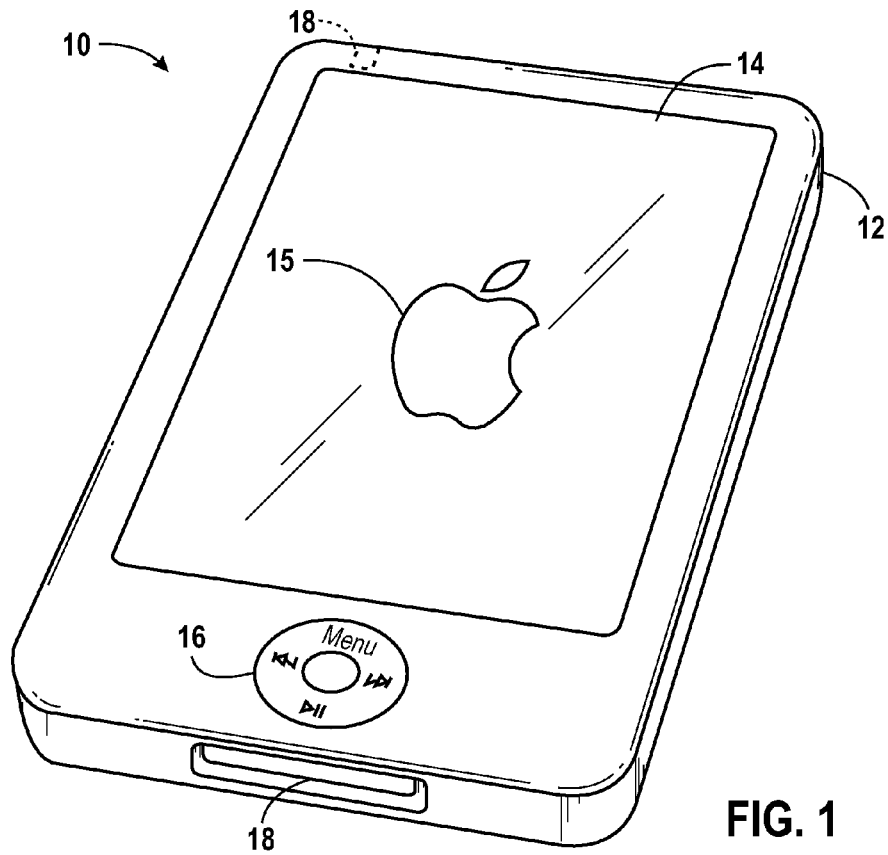
FIG. 1 is a perspective view illustrating an electronic device in accordance with one embodiment of the present invention.

Turning now to the drawings, FIG. 1 depicts an electronic device 10 in accordance with one embodiment of the present invention. In the illustrated embodiment, the electronic device 10 may be a portable media player, such as any model of an iPod or an iPhone available from Apple Inc. However, the presently disclosed techniques may be applicable to a variety of other electronic devices, such as, for example, cellular phones, notebook computers, handheld computers (e.g., PDAs and personal organizers), or the like.

In certain embodiments, the device 10 may be powered by one or more rechargeable and/or replaceable batteries. Such embodiments may be highly portable, allowing a user to carry the electronic device 10 while traveling, working, exercising, and so forth. In this manner, and depending on the functionalities provided by the electronic device 10, a user may use and operate the device 10 while moving freely with the device 10. Moreover, the device 10 may be sized such that it fits relatively easily into a pocket or a hand of the user. While certain embodiments of the present invention are described with respect to a portable electronic device, it should be noted that the presently disclosed techniques may be applicable to a wide array of other, less portable, electronic devices and systems.

In the presently illustrated embodiment, the exemplary device 10 includes an enclosure or housing 12, a display 14, a user input interface 16, and input/output connectors 18. The enclosure 12 may be formed from plastic, metal, composite materials, or other suitable materials, or any combination thereof and may function to protect the interior components of the electronic device 10 from physical damage and/or from electromagnetic interference (EMI).

The display 14 may be a liquid crystal display (LCD), a light emitting diode (LED) based display, an organic light emitting diode (OLED) based display, or some other suitable display. In accordance with certain embodiments of the present invention, the display 14 may display a user interface and various other images, such as logos, avatars, photos, album art, and the like, generally depicted by reference numeral 15. The display may also include various function and/or system indicators to provide feedback to a user, such as power status, call status, memory status, or the like. These indicators may be incorporated into a user interface displayed on the display 14.

In one embodiment, one or more of the user input structures 16 are configured to control the device 10, such as by controlling a mode of operation, an output level, an output type, etc. For instance, the user input structures 16 may include a button to turn the device 10 on or off. Further, the user input structures 16 may allow a user to interact with the user interface on the display 14. Embodiments of the portable electronic device 10 may include any number of user input structures 16, including buttons, switches, a control pad, a scroll wheel, or any other suitable input structures. The user input structures 16 may work with the user interface displayed on the device 10 to control functions of the device 10 and/or any interfaces or additional devices connected to or used by the device 10. For example, the user input structures 16 may allow a user to navigate a displayed user interface.

The exemplary device 10 may also include various input and output ports 18 to allow connection of additional devices. For example, a port 18 may be a headphone jack that provides for the connection of headphones. Embodiments of the present invention may include any number of input and/or output ports, such as headphone and headset jacks, universal serial bus (USB) ports, IEEE-1394 ports, and AC and/or DC power connectors. Further, the device 10 may use the input and output ports to connect to and send or receive data with any other device, such as other portable electronic devices, personal computers, printers, or the like. For example, in one embodiment, the device 10 may connect to a personal computer via an IEEE-1394 connection to send and receive data files, such as media files. In certain embodiments, the device 10 may use the input and output ports 18 to communicate with a diagnostic tool, for example, when the device 10 is being serviced.

Figure 2:
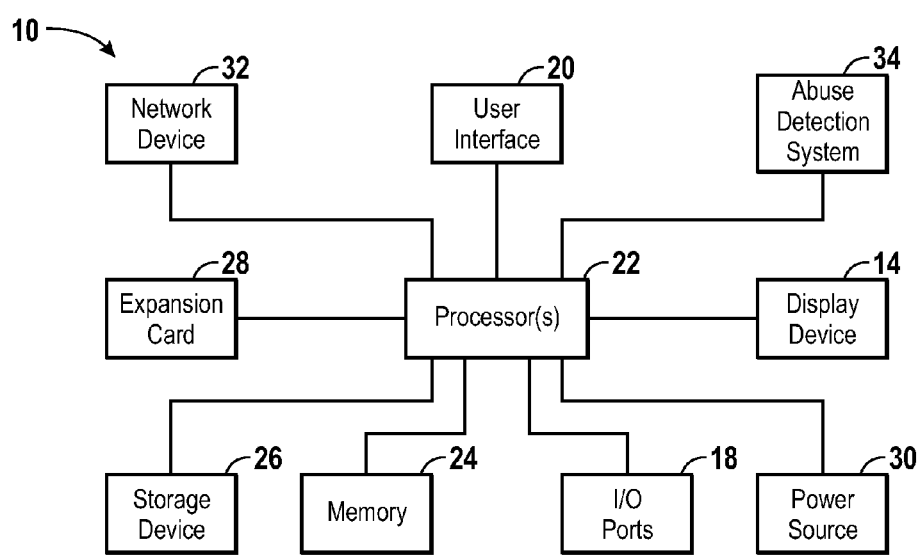
FIG. 2 is a simplified block diagram illustrating components of the electronic device of FIG. 1 in accordance with one embodiment of the present invention.

Turning now to FIG. 2, a block diagram of components of an illustrative electronic device 10 is shown in accordance with one embodiment of the present invention. The block diagram includes the display 14 and I/O ports 18 discussed above. In addition, the block diagram of FIG. 2 illustrates a user interface 20, one or more processors 22, a memory device 24, a non-volatile storage 26, card interface(s) 28, a power source 30, a networking device 32, and an abuse detection system 34.

As discussed herein, the user interface 20 may be displayed on the display 14, and may provide a means for a user to interact with the electronic device 10. The user interface 20 may, in certain embodiments, allow a user to interface with displayed interface elements via one or more user input structures 16 and/or via a touch sensitive implementation of the display 14. In such embodiments, the user interface provides interactive functionality, allowing a user to select, by touch screen or other input structures, from among options displayed on the display 14. Thus the user can operate the device 10 by appropriate interaction with the user interface 20.

The processor(s) 22 may provide the processing capability required to execute the operating system, programs, user interface 20, and any other functions of the device 10. The processor(s) 22 may include one or more microprocessors, such as one or more "general-purpose" microprocessors, one or more special-purpose microprocessors and/or ASICS, or some combination thereof. For example, the processor 22 may include one or more reduced instruction set (RISC) processors, such as a RISC processor manufactured by Samsung Electronics, as well as graphics processors, video processors, and/or related chipsets.

Embodiments of the electronic device 10 may also include a memory 24. The memory 24 may include a volatile memory, such as random access memory (RAM). The memory 24 may store a variety of information and may be used for various purposes. For example, the memory 24 may store the firmware for the device 10, such as an operating system, as well as other programs that enable various functions of the device 10 including user interface functions and processor functions. Moreover, the memory 24 may be used for buffering or caching data during operation of the device 10.

The non-volatile storage 26 of device 10 of the presently illustrated embodiment may include read-only memory (ROM), flash memory, a hard drive, or any other suitable optical, magnetic, or solid-state storage medium, or a combination thereof. The storage 26 may store data files such as media (e.g., music and video files), software (e.g., for implementing functions on device 10), preference information (e.g., media playback preferences), wireless connection information (e.g., information that may enable the device 10 to establish a wireless connection, such as a telephone connection), subscription information (e.g., information that maintains a record of podcasts, television shows, or other media to which a user subscribes), telephone information (e.g., telephone numbers), and any other suitable data.

The embodiment illustrated in FIG. 2 also includes one or more card slots 28. The card slots may be configured to receive expansion cards that may be used to add functionality to the device 10, such as additional memory, I/O functionality, or networking capability. Such an expansion card may connect to the device through any type of suitable connector, and may be accessed internally or external to the enclosure 12. For example, in one embodiment, the card may be a flash memory card, such as a SecureDigital (SD) card, mini- or microSD, CompactFlash card, Multimedia card (MMC), or the like. Additionally, in an embodiment including mobile telephone functionality, a card slot 28 may receive a Subscriber Identity Module (SIM) card.

The device 10 may also include a power source 30. In one embodiment, the power source 30 may be one or more batteries, such as a Li-Ion battery, may be user-removable or secured to the housing 12, and may or may not be rechargeable. Additionally, the power source 30 may include AC power, such as provided by an electrical outlet, and the device 10 may be connected to the power source 30 via the I/O ports 18.

The device 10 may further include a network device 32, such as a network controller or a network interface card (NIC). In one embodiment, the network device 32 may be a wireless NIC providing wireless connectivity over any 802.11 standard or any other suitable wireless networking standard and allowing the device 10 to communicate over a network, such as a LAN, WAN, MAN, or the Internet. Further, the device 10 may connect to and send or receive data with any device on the network, such as other portable electronic devices, personal computers, printers, and so forth. Alternatively, in some embodiments, the portable electronic device may not include a network device 32. In such an embodiment, a NIC may be added into card slot 28 to provide similar networking capability as described above.

The exemplary device 10 depicted in FIG. 2 also includes an abuse detection system 34 for detecting the occurrence of consumer abuse events which may be provided by a low powered special-purpose processing unit and/or an ASIC, or some combination thereof. The abuse detection circuitry 34 may be configured to detect any one or any combination of consumer abuse events and to generate and store a record of the occurrence of such events for later analysis. For example, the consumer abuse event record may be accessed and analyzed (e.g. through I/O port 18) when a device 10 is being serviced following a device malfunction. The operation and components of the abuse detection system 34 will be discussed in further detail below.

Figure 3A:
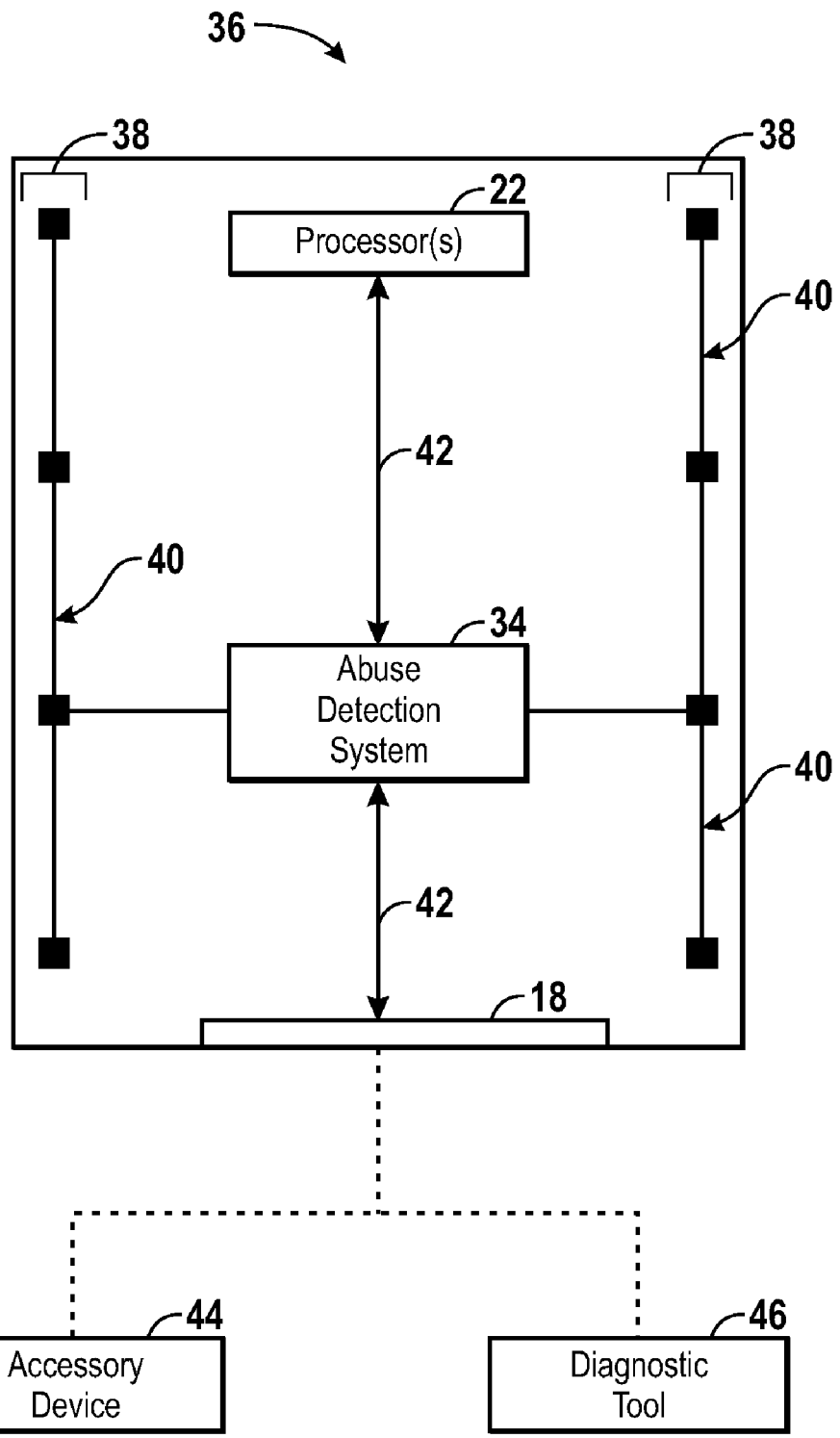
FIG. 3A is simplified view of a circuit board including an abuse detection system in accordance with one embodiment of the present invention.

FIG. 3A illustrates a block diagram of a circuit board 36 including the above discussed abuse detection system 34. The circuit board 36 may have, electronically coupled thereon, a plurality of sensors 38 arranged in a matrix. The plurality of sensors 38 may be all of the same type for detecting one type of consumer abuse event or may include different types of sensors for detecting multiple types of consumer abuse events. In the illustrated embodiment, the plurality of sensors 38 is positioned generally along the edges of the circuit board 36. Such an arrangement may be beneficial for detecting certain types of consumer abuse events, for example, liquid ingress due to liquid exposure.

Each of the plurality of sensors 38 may be electronically coupled to the abuse detection system 34. For example, as illustrated by connection lines 40, each of the plurality of sensors 38 may be directly connected to the abuse detection system 34 or indirectly connected through another sensor. Each of the plurality of sensors 38 may be configured to detect at least one type of consumer abuse event and, upon detecting an abuse event, to provide indication of the occurrence of the abuse event to the abuse detection system 34. In one embodiment, each of the plurality of sensors 38 may be configured to provide the indication that a consumer abuse event has occurred if a sensor measures a parameter related to the abuse event that exceeds a predetermined threshold. The abuse detection system 34 may also continually monitor each of the plurality of sensors 38 to determine the occurrence of an abuse event, such as by detecting a state change in a sensor.

Upon receiving indication that an abuse event has occurred, the abuse detection system may store a record of the detected abuse event indicated by any of the plurality of sensors 38 as will be discussed in more detail below. In some embodiments, the abuse detection system 34 may, upon receiving indication from any one of the plurality of sensors 38, be further configured to temporarily or, in some cases, permanently disable operation of the device 10.

The circuit board 36 may also include one or more of the above discussed input and output (I/O) ports 18. In the illustrated embodiment, an I/O port 18 may be configured to interface the device 10 with one or more additional devices, such as an accessory device 44, or a diagnostic tool 46. The I/O port 18 may be coupled to a dual-mode bidirectional communication interface, as represented by reference numeral 42. The dual-mode interface 42 allows for various types of external devices, such as an accessory device 44 or a diagnostic tool 46, to be connected to the device 10 via the circuit board 36 and the I/O port 18, and may allow for different modes of communication, such as a normal communication mode for allowing accessory devices 44 to communicate with the one or more processors 22, or a diagnostic mode for allowing diagnostic devices 46 to communicate with the abuse detection system 34. The dual-mode communication interface 42 may include separate sub-interfaces for each mode of communication, as will be discussed below.

In certain embodiments of the present invention, the dual-mode communication interface 42 may be capable of providing multiple modes of communication with the abuse detection system 34 and/or one or more processors 22. The selection of a particular communication mode may depend, for example, on the type of external device presently connected to the device 10 via the I/O port 18. In the presently illustrated embodiment, a communication selection block (not shown in FIG. 3A) may be provided and configured to select between two or more modes of communication. The communication selection block may be included as part of the abuse detection system 34, or may be a separately provided circuit. The selection of the communication modes by the communication selection block may depend at least partially on the type of external device connected to the device 10 via the I/O port 18.

As described above, the dual-mode communication interface 42 may provide one mode of communication between the device 10 and an external device designated as a "normal" mode of communication, which may be a default mode of communication between the device 10 and any type of accessory device, as represented by the illustrated accessory device 44. Examples of accessory devices 44 may include a docking station, an FM radio transmitter, speakers and/or headphones, a personal computer or laptop, or a printer, just to name a few. Thus, when operating in the normal/default communication mode, the abuse detection system 34 may be configured to simply pass data between an accessory device 44 and the processor 22. In one embodiment, the normal communication mode may be implemented by a set of universal asynchronous receiver/transmitter (UART) lines. It will be appreciated, however, by those skilled in the art, that any suitable type of known device interface, such as Universal Serial Bus (USB) or FireWire (IEEE 1394), may be used. In further embodiments, wireless interfaces, such as 802.11 a/b/g standards, infrared, and BlueTooth, may also be implemented.

As discussed above, the dual-mode communication interface 42, in accordance with embodiments of the present invention, may also provide for a second diagnostic communication mode which may be reserved for diagnostic functions, such as when the device 10 is interfaced with a diagnostic tool 46 via the I/O port 18. The diagnostic mode may be enabled, for example, when the diagnostic tool 46 is connected to the I/O port 18, by providing a control signal to a communication selection block (not shown in FIG. 3A) or by detecting a specific sequence of commands or inputs on the normal interface (e.g., UART). Upon enabling the diagnostic communication mode, the abuse detection system 34 stops passing data via the UART lines, and "switches" over to enable communication through the diagnostic interface lines of the dual-mode interface 42. In certain embodiments, the diagnostic communication mode may be provided by a less complex interface compared to the interface used in the normal communication mode. For example, the diagnostic communication may be implemented by a two-wire interface, such as an $I^2C$ interface. It will be appreciated, however, by those skilled in the art, that other relatively simple interfaces, such as a Serial Peripheral Interface (SPI) Bus, a System Management Bus (SMBus), or an Intelligent Platform Management Interface (IMPI) may also be utilized. Additional details regarding the operation of the above discussed communication selection block and the selection of the normal and the diagnostic communication modes will be discussed in additional detail below.

Providing a designated diagnostic mode of communication through a common accessory interface (e.g., I/O port 18) may be beneficial for several reasons. For example, in the scenario that consumer abuse has resulted in damage rendering the device 10 inoperable, the diagnostic tool 46 may be interfaced with the device 10 via the illustrated input and output port 18 in order to aid in analyzing the cause of the damage or failure. Such diagnostic equipment may be configured to read and analyze data stored in the abuse detection system 34, for example, through the dual-mode communication interface 42 operating in a diagnostic mode. Based on the information stored in the abuse detection system 34, it may be determined whether or not consumer abuse occurred and/or if the consumer abuse is attributable to the damage or failure of the device 10. As will be discussed in further detail below, such a determination may be a deciding factor as to whether a consumer returning a damaged or inoperative device is entitled to a replacement product or repair service under the terms of a warranty agreement.

While the illustrated embodiment in FIG. 3A depicts a single circuit board 36, in other embodiments, the device 10 may include a plurality of circuit boards. In such embodiments, the plurality of sensors 38 may be distributed among the plurality of circuit boards and need not be confined to the circuit board 36 including the abuse detection system 34.

Moreover, in such embodiments, each of the plurality of circuit boards may include its own respective abuse detection system 34 for detecting one or multiple types of consumer abuse events.

Figure 3B:
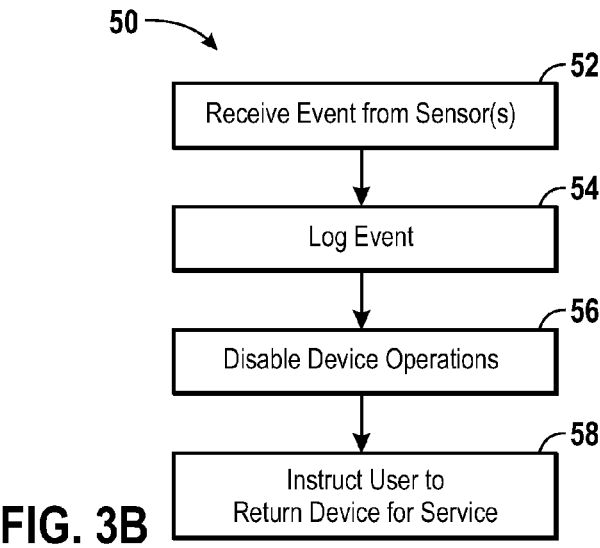
FIG. 3B is a flow chart illustrating an exemplary method for operating the abuse detection system of FIG. 3A.

FIG. 3B illustrates a flowchart depicting an exemplary method 50 for operating the abuse detection system 34 of FIG. 3A in accordance with one embodiment of the present invention. As discussed above, the plurality of sensors 38 may be all of the same type of sensor for detecting the occurrence of one type of consumer abuse, or may include several different types of sensors for detecting multiple types of consumer abuse. Operation of the abuse detection system 34 may be initiated upon receiving indication of an abuse event from one or more of the plurality of sensors 38, as depicted at step 52. As discussed above, such indication may occur when the abuse detection system 34 monitoring the plurality of sensors 38 determines that a sensed parameter relating to the abuse event being monitored has exceeded a certain threshold. Additionally, each of the plurality of sensors 38 may also be capable of providing an alarm signal to the abuse detection system 34, indicating that an abuse event has occurred.

Upon receiving indication of the occurrence of consumer abuse, the abuse detection system 34 may store or log the occurrence of the abuse event, as depicted at step 54. The logged event may be stored, for example, in a non-volatile storage device which may be included as part of the abuse detection system 34 or, in other embodiments, may be a separate structure from the abuse detection system 34. As discussed above, the abuse detection system 34 may also disable device operations upon the detection of a consumer abuse event, as indicated by step 56. This functions as a safety mechanism to prevent the user from further using or operating the device 10 in any way which may result in further abuse. By way of example, disabling the device 10 may be accomplished by disabling the power source 30, disabling functionalities of the device 10 through software settings, and so forth.

At step 58, the device 10 may provide the user with some indication that the user should return the device 10 either directly to the manufacturer or to the original point of sale for service. This may be accomplished by any type of indicator, for example, an LED indicator or, in the portable media player illustrated in FIG. 1, by displaying a text message on the display 14. Specific steps for servicing and/or diagnosing the device 10 will be discussed in further detail below.

Figure 4A:
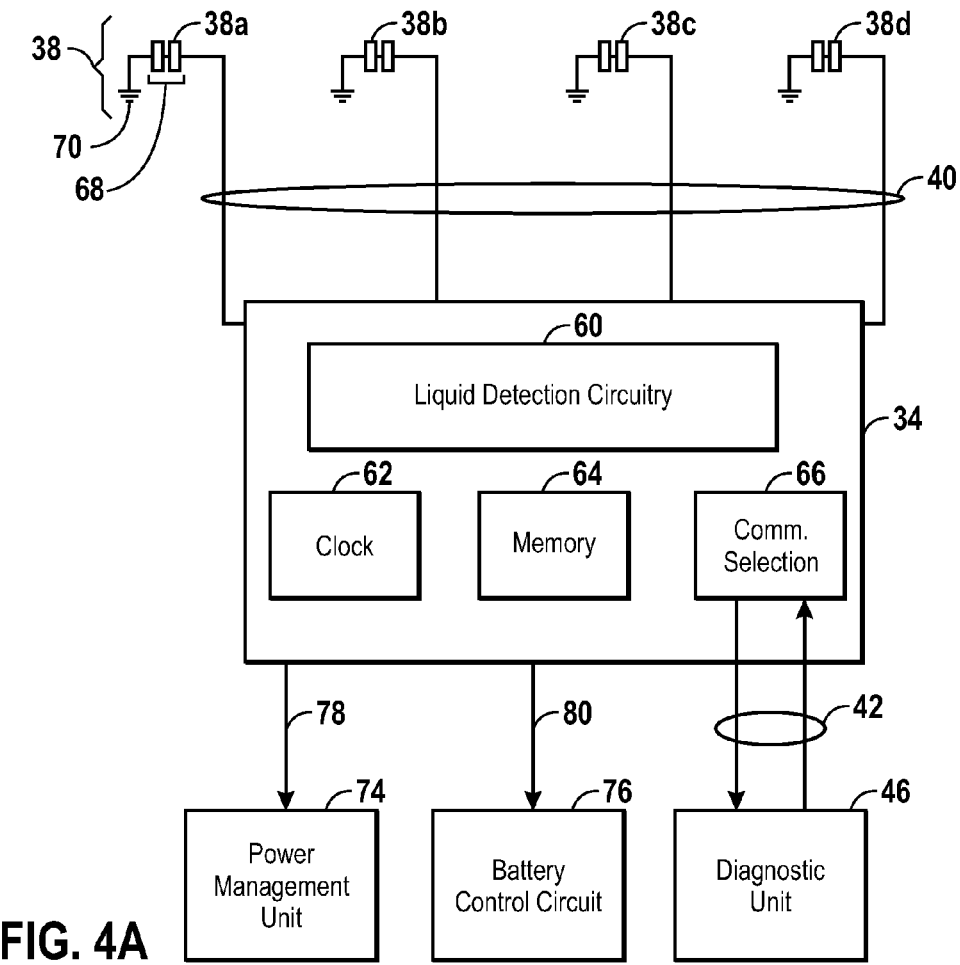
FIG. 4A is a block diagram illustrating a diagrammatical view of a consumer abuse detection system in accordance with one embodiment of the present invention.

Referring now to FIG. 4A, a block diagram illustrating a more detailed view of an abuse detection system 34, in accordance with one embodiment of the present invention, is illustrated. In particular, the abuse detection system 34 of the illustrated embodiment is adapted to detect liquid exposure, a common type of consumer abuse. While many components in modern electronic devices are hermetically sealed and can survive submersion in liquid without damage, pads and traces on component boards (e.g. circuit board 36), upon coming into contact with a liquid, may be susceptible to electrolyses which may cause the metal forming the pads and traces on the board to migrate from the pads and traces to other areas of the component board. Thereafter, even when the liquid has completely dried, the resultant residue may be highly conductive and may cause short-circuiting to occur. This is particularly problematic for circuitry utilizing dense process architectures and/or high impedance circuit nodes, both of which are prevalent in modern electronics and, particularly, portable electronics.

The abuse detection system 34 of the presently illustrated embodiment may include liquid detection circuitry 60, a clock 62, a memory device 64, and a communication selection block 66. A plurality of sensors 38 may be electronically coupled to the abuse detection system 34 via one or more communication lines as indicated by reference number 40. In the presently illustrated embodiment the plurality of sensors 38 may be provided by a plurality of liquid detection sensors 38a-38d. In accordance with one embodiment of the present invention, each of the liquid detection sensors 38a-38d may include two sense points, as depicted by reference numeral 68, across which a voltage is measured. For example, the sense points 68 may be provided by two small exposed pads on a circuit board 36 with one pad connected to ground 70, and a second pad routed to the abuse detection circuitry 34. It should be noted that although two contacts are needed, the grounded contact may be tied to a common system ground, thereby reducing the amount of routing required for each sensor 38a-38d.

During normal operation of the device 10, there should be no current across the two sense points 42. However, when a liquid enters the device 10 and makes contact with the two sense points 42, a current will begin to flow. Accordingly, each of the plurality of liquid detection sensors 38a-38d may be configured to measure the current across the sense points 42 while being continuously monitored by the abuse detection system 34. If the abuse detection system 34 detects that any of the liquid detection sensors 38a-38d is reporting a current that is above a predetermined current threshold, it may be determined that liquid exposure has occurred. Additionally, the liquid detection sensors 38a-38d themselves may be configured to send an alarm signal to the abuse detection system 34 indicating that the device has been exposed to liquid upon measuring a current that exceeds the predetermined threshold.

Upon receiving indication from any one of the liquid detection sensors 38a-38d that liquid ingress has been detected in the device 10, the liquid detection circuitry 60 may be configured to generate a data entry corresponding to the detected liquid abuse event. The data entry may be of any suitable form of data for indicating the occurrence of the abuse event, in this case, the detection of liquid ingress. For example, in the presently illustrated embodiment, the liquid detection circuitry 60 may generate a timestamp corresponding to the date and time at which the liquid ingress event was detected by the sensors 38a-38d and store the timestamp into a storage device 64, which may be provided by any suitable non-volatile storage device, such as an electrically erasable and programmable read-only memory (EEPROM).

The timestamp may be generated based on the clock 62. The clock 62 may be implemented as to provide a desired timing resolution. For example, in one embodiment, where only information relating to the year, month, week, and day the abuse event occurred is of interest, the clock 62 may be provided by an RC oscillator. Although an RC oscillator may not provide the accuracy of a real-time clock (e.g., down to minutes and seconds), the RC oscillator may be routinely calibrated, for example, by resetting the RC oscillator each time the device 10 is cycle powered on. In further embodiments, in which a finer timing resolution is desired, the clock 62 may generate timestamps derived from an internal system clock, such as provided by a crystal oscillator. Further, although the presently illustrated embodiment depicts the clock 62 as being integrated with the abuse detection system 34, in alternate embodiments, the clock 62 may be implemented separately from the abuse detection system 34.

The abuse detection system 34 may also be configured to store device state information. For example, the device 10 may be configured to periodically write the state of the device 10 to the abuse detection system 34. State information may include, for example, an "on" state indicating that the device 10 is powered on, an "off" state indicating that the device 10 is powered off, or a "sleep" state indicating that the device 10 is powered but in a sleep or stand-by mode. Additional states may be defined based on the particular functionalities of the device 10. For example, a device 10 capable of placing cellular phone calls may include an "in-call" state to indicate that a user using the device 10 is currently on a telephone call. When an abuse event is detected by the abuse detection system 34, the above discussed timestamp and the last known state of the device 10 may be recorded into the storage device 64 of the abuse detection system 34. Additionally, the state information may be temporally correlated with the timestamp information. By analyzing state and timestamp information, a service technician may be able to determine how the device 10 was being used at the moment an abuse event was detected by the abuse detection system 34. This analysis may be particularly useful in verifying the occurrence or non-occurrence of consumer abuse.

Additionally, in more complex embodiments, the indication received from the liquid detection sensors 38a-38d may also include an identification component which may be used by the abuse detection circuitry 34 and diagnostic equipment (e.g., diagnostic tool 46) to identify the specific sensor that detected the abuse event. For example, in embodiments utilizing such identification features, diagnostic unit 46 may be able to identify which particular sensor detected the abuse event or, in the case where abuse events are reported by multiple sensors, identify the order or progression in which the sensors 38a-38d detected the events. Such data may be useful for determining where on the device 10 liquid ingress initially began and, based on the positioning of the sensors 38a-38d, to what extent the liquid ingress progressed into the device 10. In some embodiments, the diagnostic unit 46 may be capable of generating a visual map based on the positions of a plurality of sensors 38 in order to determine the progression of liquid ingress into the device 10. This data may be particularly useful to manufacturers for identifying areas on a particular product which may be more susceptible to liquid ingress than others so that future designs of the product may be tailored to overcome such weaknesses.

As discussed above, upon the detection of liquid ingress, it may be desirable to shut off or disable the power source 30 in order to remove power from the device 10, thus reducing the risk of electrolyses occurring. The above discussed power source 30 may include both a battery power source, such as one or more rechargeable or non-rechargeable batteries, and AC power, such as provided by an electrical outlet. In the presently illustrated embodiment, the device 10 may include a power management unit 74 and a battery protection circuit 76. The power management unit 74 may include logic configured to handle power up and power down sequences and other external wake or sleep events. By way of example, the power management logic may comprise a real time clock, as well as a network of linear and switching regulators. Further, in portable devices which may be powered by both AC power and battery power, such as the portable media player illustrated in FIG. 1, the power management unit 74 may further include battery charging circuitry configured to charge a battery power source.

The battery protection circuit 76 of the presently illustrated embodiment may be configured to monitor the cell voltage and/or output current of a battery. If the battery protection circuit 76 detects an excessive current being drawn from the battery, the battery protection circuit 76 may be further configured to disable the output of the battery via a disabling mechanism. The disabling mechanism may be provided, for example, by back-to-back field effect transistors (FETs). Additionally, the battery protection circuit 76 may be configured to monitor the battery status during charging phases (e.g., charging via AC power). Additionally, in embodiments where the device 10 utilizes rechargeable batteries, the battery protection circuit 76 may be further configured to monitor the charging current while the battery is being recharged (e.g., via AC power). Moreover, although the presently illustrated embodiment describes the battery protection circuit 76 as being a standalone unit separate from the abuse detection system 34, in alternate embodiments, the battery protection circuit 76 may be integrated into the abuse detection system 34, or may be located on the battery unit itself.

As discussed above, the device 10 may be powered by multiple power sources (e.g. AC power, battery power). Accordingly, all power sources must be disabled in order to completely shut off power to the device 10. In the presently illustrated embodiment, the liquid detection circuitry 60, upon receiving signals indicating liquid ingress from the liquid detection sensors 38a-38d, may be configured to disable both the power management unit 74 and the battery protection circuit 76. This may be accomplished, for example, by sending a power disable signal, via the connection line 78, to the power management unit 74 and by sending a battery output disable signal, via the connection line 80, to the battery protection circuit 76.

Although the power to the device 10 is disabled following the detection of an abuse event, the abuse detection system 34 remains powered. In one embodiment, the abuse detection system 34 may be located at the battery unit so that it can continue to be powered even after the battery protection circuit 76 has disabled the battery power output to the device 10. In another embodiment, a high impedance current limited tap that is independent of the battery protection circuit 76 may be run from the battery unit to the abuse detection system 34. Given the high impedance and the relatively low current consumption requirements of the abuse detection system 34, the threat to the device 10 due to liquid ingress is at most minimal even if the current tap is shorted.

The abuse detection system 34 may be further configured to enter into a sleep mode upon the detection of an abuse event. Thus, although the abuse detection system 34 remains powered, its internal components, such as the liquid detection circuitry 60, may be temporarily inactive (e.g., stops monitoring the sensors 38a-d) during the sleep period. Further, upon entering into sleep mode, the abuse detection system 34 may also initiate a wake-up timer, which may be configured to count for a predetermined amount time before waking the abuse detection system 34. In the presently illustrated embodiment, the wake-up timer may be timed by the clock 62.

After the predetermined wake-up time has expired, the abuse detection system 34 may wake from the sleep mode and check the device 10 to determine whether an abuse event is still occurring. For example, in the presently illustrated embodiment, after the abuse detection circuit wakes, the liquid detection circuitry 60 may recheck the liquid detection sensors 38a-38d to determine if liquid ingress is still occurring. If indication is received that liquid ingress is still occurring, the abuse detection system 34 may enter the sleep mode once again, and reinitiate the wake-up timer. This process may repeat until liquid ingress is no longer detected.

If upon returning from sleep mode, the liquid detection circuitry 60 determines that liquid ingress is no longer occurring (e.g., recheck the liquid detection sensors 38a-38d), then the abuse detection system 34 may instruct the device to initiate a self test function to determine if any damage resulted from the initial liquid ingress event. If the self test determines that no damage has occurred, then the liquid detection circuitry 60 may re-enable the power management unit 74 and the battery protection circuit 76 via connection lines 78 and 80, respectively. At this point, the user may resume operating the device 10 normally. On the other hand, if the self test results indicate that there is damage or the possibility of damage, then the device 10 may remain in a disabled or reduced and/or limited operational mode. In the reduced or limited operational mode, normal functions, such as playing video files, browsing the Internet, or making phone calls, may remain disabled and inaccessible. In one embodiment, operation of the a potentially damaged device 10, as determined by the self test function, may be limited to providing the user an indication that the device 10 should be returned to the manufacturer or to the point of sale for service. As described above in step 58 of FIG. 3B, the indication may be provided by any type of indicator, such as an LED indicator or, in the portable media player illustrated of FIG. 1, by the display of a text message on the display 14 instructing the user of the need for service.

Servicing of the device 10 may include connecting one or more diagnostic devices (e.g., diagnostic tool 46) to the dual-mode communication interface 42 via I/O port 18, for example. The dual-mode communication interface 42, as discussed above, may include multiple interface types to facilitate different modes of communication, such as a normal communication mode which may be a default communication mode allowing the device 10 to communicate with accessory devices (e.g., accessory device 44), as well as a diagnostic communication mode. For example, in one embodiment, the normal communication mode may be provided by a UART interface, while the diagnostic communication mode may be provided by a two-wire interface, such as an $I^2C$ interface. During the normal communication mode, the abuse detection system 34 may be configured to simply pass data between the accessory device 44 and the processor(s) 22 of the device 10, as illustrated in FIG. 3A. However, the device 10 may be triggered to enter into the diagnostic mode, in which the abuse detection system 34 stops passing data via the UART lines and switches over to the $I^2C$ lines of the dual-mode communication interface 42 to allow diagnostic communications between the abuse detection system 34 and a diagnostic tool 46. Switching from the normal mode to the diagnostic mode may be enabled or triggered by any known means. For example, the device 10 may be configured to switch to diagnostic mode upon detecting the connection of a specialized diagnostic tool 46 to the I/O port 18 or upon detecting a specific sequence of command or inputs on the UART lines, just to provide a few examples.

In the presently illustrated embodiment, the selection of the communication mode (e.g., normal or diagnostic) and respective corresponding interface (e.g., UART or $I^2C$) may be determined by the communication selection block 66. The communication selection block 66 may be provided by any suitable type of selection logic or circuitry. In one embodiment, the communication selection block 66 may be provided by a multiplexer. In this embodiment, the UART and $I^2C$ interfaces provided by the dual-mode communication interface 42 are effectively multiplexed by the communication selection block 66 and may selected in accordance with known methods. For example, the communication selection block 66 may be configured to switch from normal to diagnostic mode upon receiving a specific enable control signal. This control signal maybe provided upon connection of the diagnostic tool 46 to the device 10 via the I/O port 18, or may be generated following the detection of a specific sequence of command or inputs on the UART lines, as described above.

Thus, when the device 10 is returned to an authorized facility for service following a power down/disable due to an abuse event, the diagnostic unit 46 may be interfaced with the device 10 to communicate with the abuse detection system 34 through the dual-mode communication interface 42 in a diagnostic mode (e.g., via $I^2C$ interface) in order to analyze the data collected by the abuse detection system 34.

Further, in addition to limiting the access of the diagnostic communication mode to specific events or occurrences, as described above, embodiments of the present invention may include safeguards designed to provide the integrity of the abuse detection system 34. For example, the abuse event data stored in the non-volatile storage 64 may utilize known data encryption techniques and/or require a passkey or other form of secured authentication before access to the data is permitted. Additionally, the device 10 may be configured to detect the removal of the abuse detection system 34 and to prevent booting or operation of the device 10 when an absence of the abuse detection system 34 is detected. Such additional safeguards may be a useful countermeasure against crafty consumers who may attempt to remove, access, alter, and/or erase abuse event data stored in the non-volatile storage 64, such as for purposes of filing a false warranty claim.

While the above discussed features of the abuse detection system 34 have been described primarily with reference to hardware elements, it shall be appreciated by those skilled in the art that in additional embodiments, including the embodiments described below, one or more of these features may also be implemented via software, such as a computer program stored on any computer readable medium.

Figure 4B:
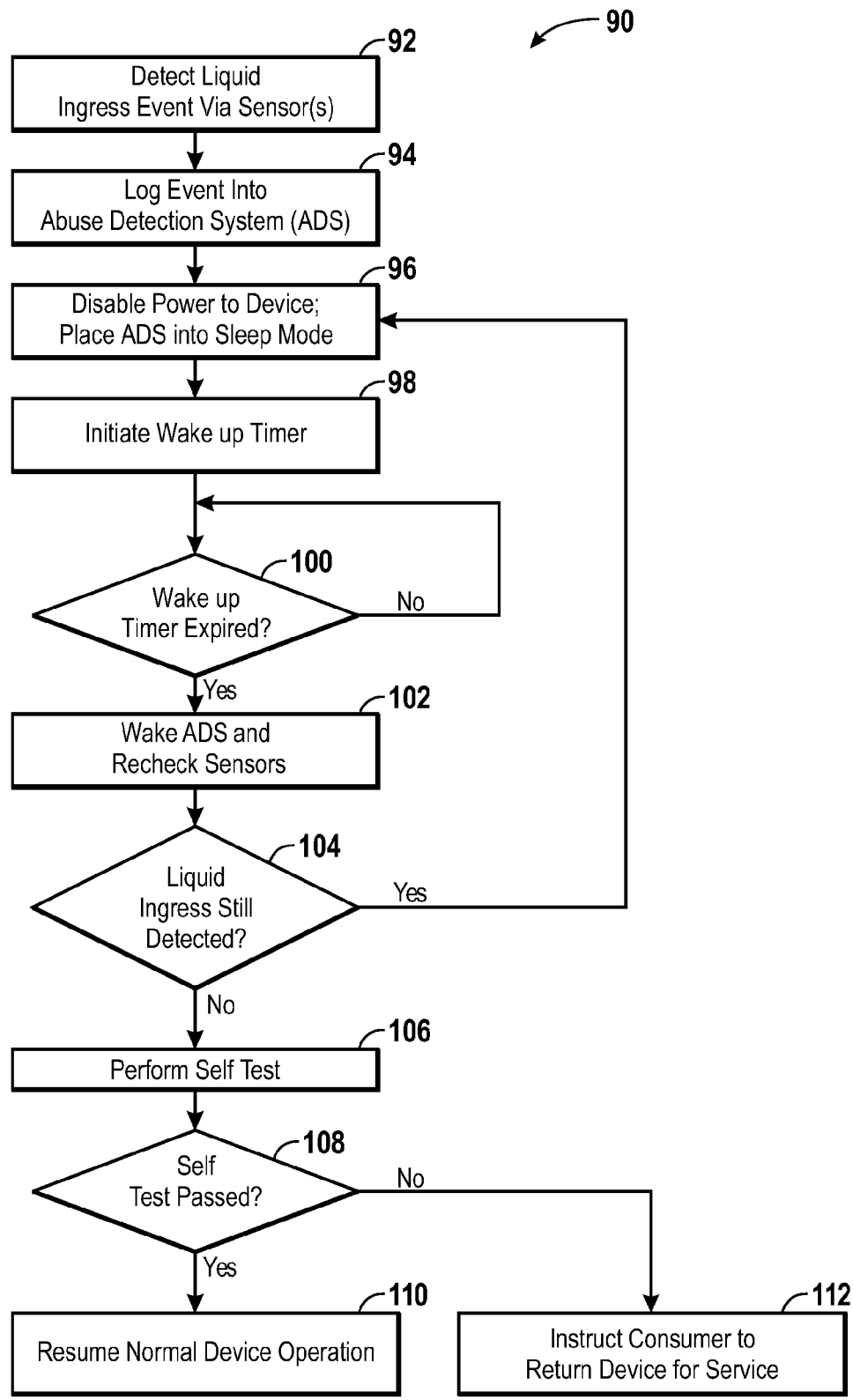
FIG. 4B is a flow chart illustrating a method of operation for the consumer abuse detection system of FIG. 4A in accordance with one embodiment of the present invention.

Turning now to the flow chart of FIG. 4B, an exemplary method 90 for operating the abuse detection system 34 of FIG. 4A is illustrated. The method 90 may be initiated upon the detection of liquid ingress via any of the liquid detection sensors 38a-38d of FIG. 4A, as represented by step 92. As discussed above, upon receiving an indication from any of the liquid detection sensors 38a-38d that liquid ingress has occurred, a data record of the liquid abuse event may be generated by the abuse detection system 34 and stored, as indicated by step 94, in the non-volatile storage device 64, for example. The data record may include a timestamp generated from the clock 62 corresponding to when the abuse event occurred. The data record may also include a sensor identification component and device state information, as discussed above.

Thereafter, at step 96, the abuse detection system 34 may disable power to the device 10 by shutting off one or more power sources 30. In the illustrated embodiment of FIG. 4A, disabling power to the device 10 may be accomplished by sending deactivation signals to each of a power management unit 74 and a battery protection circuit 76 via connection line 78 and connection line 80, respectively. As discussed above, this may significantly reduce the risk of electrolyses causing damage to circuit boards or components within the device 10. Further, upon disabling power to the device 10 in step 96, the abuse detection system 34 may transition into a standby or sleep mode.

The abuse detection system may initiate a wake-up timer at step 98, which and may be set to count for a predetermined amount of time. At step 100, the abuse detection system 34 checks the timer to determine if the predetermined amount of time has expired. If the time has not expired, the abuse detection system 34 may repeat step 100, checking the timer periodically until the time has expired. If the wake-up timer has expired, the abuse detection system 34 wakes from sleep mode, as indicated by step 102, and may be configured to determine whether the device 10 is still experiencing liquid ingress. This step may include rechecking the current readings of liquid detection sensors 38a-38d for indication of liquid ingress.

At decision block 104, if the liquid detection sensors 38a-38d indicate that liquid ingress is still present and occurring, then the abuse detection system 34 return to sleep mode, thus reverting the process back to step 96. If upon waking at step 102, the abuse detection system 34 does not detect any liquid ingress, the abuse detection system 34 may instruct the device 10 to perform a self test function at step 106 to determine if any damage resulted from the previously detected liquid ingress event or events. At decision block 108, if the device 10 passes the self test function, then power may be restored and normal functions re-enabled, allowing the user to resume using the device 10, as indicated by step 110. However, if the device 10 fails the self test performed at step 106, the user may be instructed or given indication to return to device 10 to either the manufacturer or to the point of sale for service.

Figure 5A:
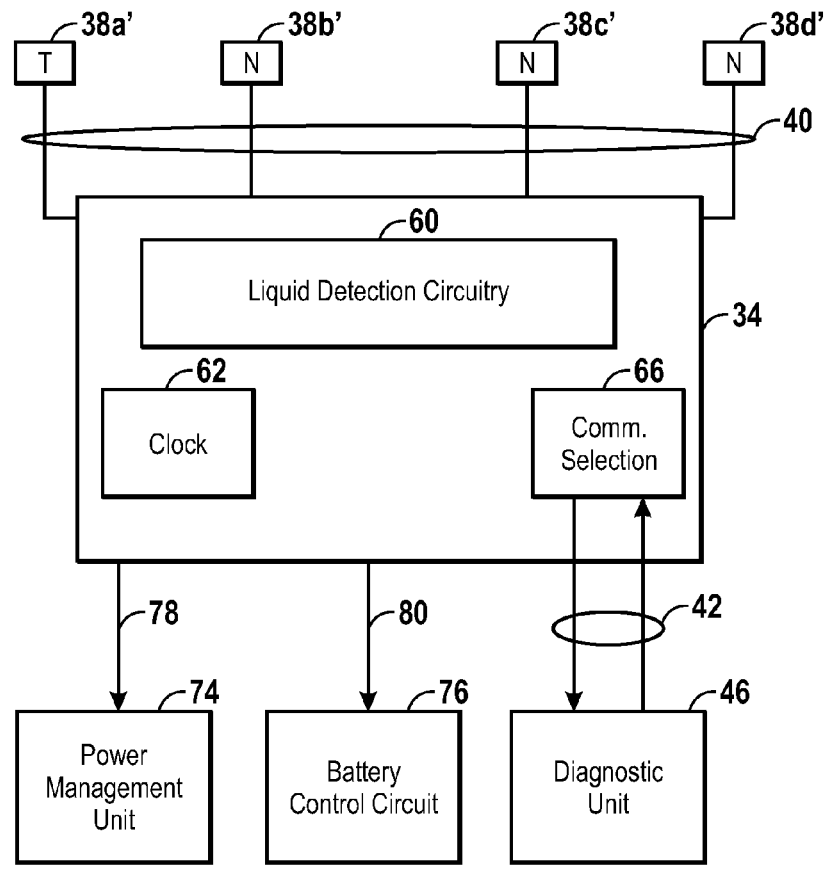
FIG. 5A is a block diagram illustrating a diagrammatical view of an alternative embodiment of the consumer abuse detection system of FIG. 4A in accordance with one embodiment of the present invention.

Referring now to FIG. 5A, a block diagram of an alternative embodiment of the liquid abuse detection system 34 of FIG. 4A, in accordance with one embodiment of the present invention, is illustrated. Blocks which perform essentially the same function in FIG. 5A as those blocks in FIG. 4A have been numbered with like reference numerals.

The presently illustrated abuse detection system 34 of FIG. 5A includes the above discussed liquid detection circuitry 60, clock 62, and communication selection block 66. The abuse detection system 34 may be electronically coupled to a plurality of liquid detection sensors 38a'-38d', wherein each of the plurality of liquid detection sensors 38a'-38d' is configured to indicate either a "normal" state or a "tripped" state. Accordingly, the abuse detection system 34 does not rely on a memory device, such as the non-volatile storage device 64 of FIG. 4A, but reads the state of each liquid detection sensor, designated by reference numerals 38a'-38d'. In one embodiment, the liquid sensors 38a'-38d' may detect the occurrence of liquid ingress in a manner similar to the above described liquid detection sensors 38a-38d of FIG. 4A, but including a memory element to store the sensor state. For example, the liquid detection sensors 38a'-38d' may indicate a normal state when no liquid abuse has occurred. However, upon the detection of liquid ingress, affected sensors, such as sensor 38a', may transition to a tripped state. Further, in certain embodiments of the present invention, the tripped sensor 38a' may be locked into the tripped state permanently. In other embodiments, a tripped sensor 38a' may be reset by an authorized service center.

When the liquid detection circuitry 60 determines that a sensor has transitioned to a tripped state, such as sensor 38a', the liquid detection circuitry 60 may be configured to disable power to the device 10. As discussed above, this may be accomplished by sending disable signals to the power management unit 74 and the battery protection circuit 76 via communication lines 78 and 80, respectively. Following the disabling of power to the device 10, the user may be provided indication to return the device 10 an authorized service center for servicing. Servicing the device 10 may include connecting a diagnostic tool 46 to the device, for example, via I/O port 18, to read the state of the liquid detection sensors 38a'-38d'. As described above, the communication selection block 66 may provide a mechanism for switching the dual-mode communication interface 42 to operate between a normal communication (e.g., UART) and a diagnostic communication mode (e.g., I²C). As will be discussed in further detail below, if no damage is detected during servicing of the device, the tripped sensor 38a' may be reset to a normal state and normal operation of the device 10 may be re-enabled.

In additional embodiments, the liquid detection sensors 38a'-38d' may also include a dielectric material. The dielectric material may be any suitable dielectric which changes properties upon being exposed to a liquid, thus providing a physical indication that the device 10 was exposed to a liquid. This information may be particularly useful in the failure analysis of returned devices so that a manufacturer may determine where liquid ingress began, and to what extent liquid ingress progressed into the device 10. Using this information, a manufacturer may be able improve future designs of a product to be more resistant to liquid ingress.

Figure 5B:
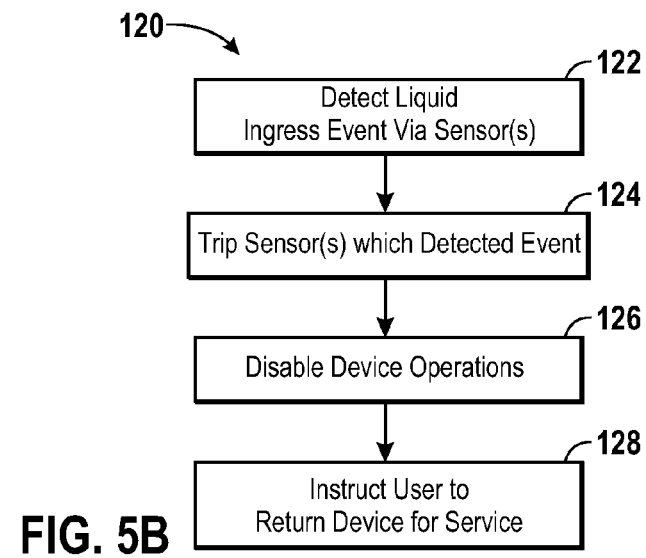
FIG. 5B is a flow chart illustrating an exemplary method for operating the abuse detection system of FIG. 5A.

FIG. 5B illustrates a flowchart depicting an exemplary method 120 for operating the abuse detection system 34 of FIG. 5A in accordance with one embodiment of the present invention. Operation of the abuse detection system 34 may be initiated upon receiving indication of the occurrence of liquid ingress, as depicted at step 122. Upon detecting the occurrence of liquid ingress, the affected sensors, such as sensor 38a', transitions from a normal to a tripped state, as illustrated by step 124. Subsequently, the abuse detection system 34 may disable operation of the device, as indicated by step 126. This functions as a safety mechanism to prevent the user from further using or operating the device 10 in any way which may result in further damage. As described above, disabling the device 10 may be accomplished by disabling the power source 30 (e.g., power management unit 74 and battery protection circuit 76), disabling functionalities of the device 10 through software settings, and so forth. At step 128, the device 10 may provide the user with some indication that the device 10 should be returned either directly to the manufacturer or to the original point of sale for service. As described above, this may be accomplished by any type of indicator, for example, an LED indicator or, in the portable media player illustrated in FIG. 1, by displaying a text message on the display 14.

Figure 5C:
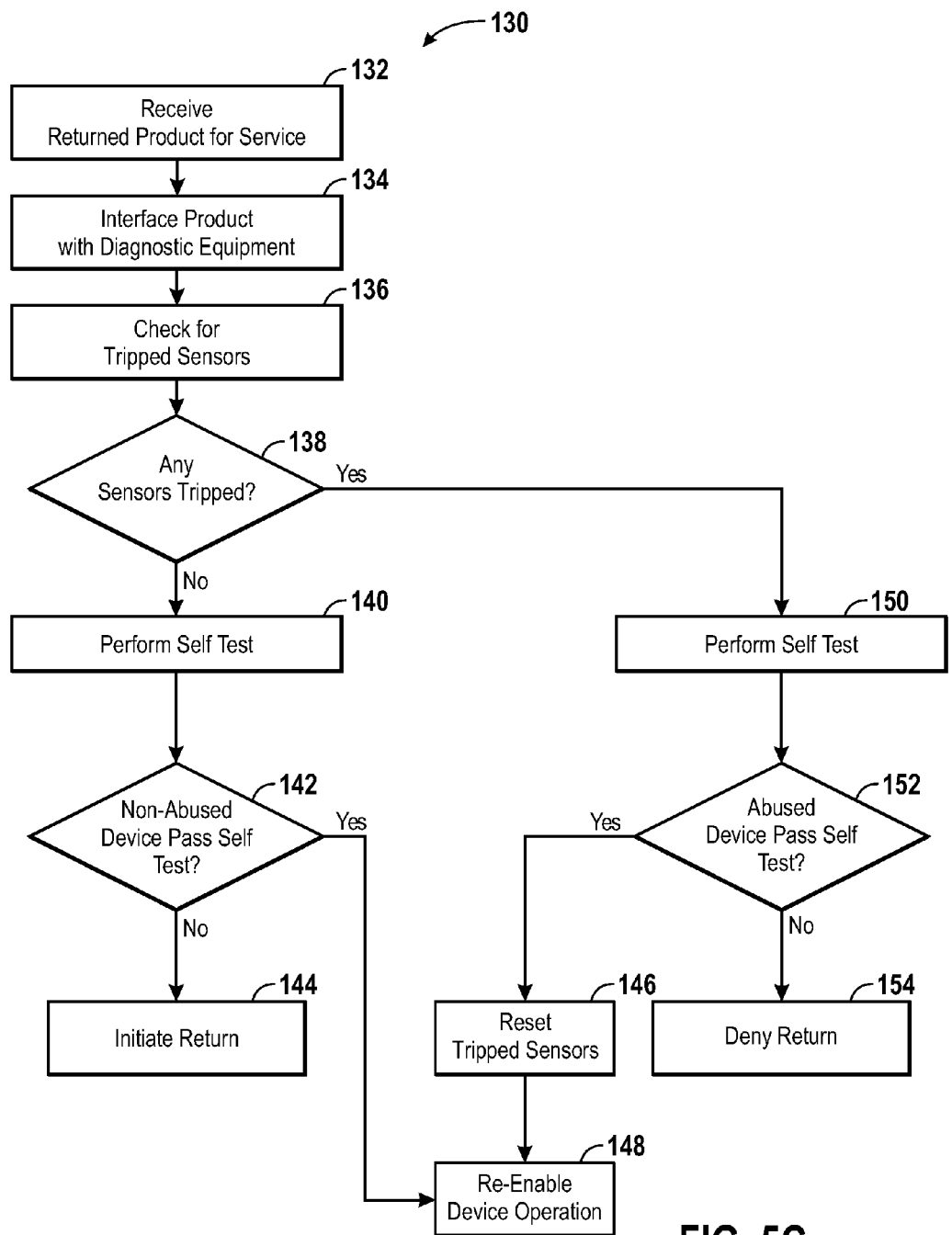
FIG. 5C is a flow chart illustrating a method for determining whether to initiate a product return in accordance with one embodiment of the present invention.

Referring now to FIG. 5C, an exemplary method 130 an exemplary method 130 for servicing the device 10 of FIG. 5A is illustrated, in accordance with one embodiment of the present invention. The method 130 is initiated at step 132 when the device 10 is returned by the consumer to an authorized service center, for example, either the manufacturer or the vendor at the point of sale for service.

At step 134, the device 10 is interfaced with diagnostic equipment. As discussed above, diagnostic equipment, such as diagnostic unit 46, may be interfaced with the device 10 via one or more I/O ports 18. The diagnostic equipment may be configured to communicate with the device 10, for example, via the dual-mode communication interface 42, which may switch the device communication mode from a normal communication mode to a diagnostic communication, thereby enabling the diagnostic tool 46 to access the abuse detection system 34 to read the sensor data, as indicated by step 136.

At decision block 138, the diagnostic tool 46 determines whether any of the sensors 38a'-38d' are in a tripped state. If the diagnosis indicates that no sensors are in a tripped state, then it may be inferred that the cause of the device malfunction or failure may have been due to a manufacturing defect or other event which would possibly be covered by a warranty policy. If it is determined so, then personnel servicing the device 10 may first initiate a self test routine, as illustrated at step 140, to determine the extent, if any, of damage present in the returned device 10. If at decision block 142, the returned device 10 passes the self test routine of step 140, then it may be concluded that the device 10 has experienced either no damage or, at most, negligible damage that is insufficient to affect normal operation of the device 10. In the latter case, personnel servicing the device 10 may re-enable normal device operations, for example, by performing a master reset of the device 10, as illustrated by step 148, and return the device 10 to the consumer. Returning to decision block 142, if the device 10 fails the self test routine of step 140, a product return may be initiated under the terms of a warranty policy as depicted by step 144, the method 130 ending thereafter. It should be understood that the term "return" as used herein may include both repairing and restoring the returned device 10 to working order, as well as exchanging the returned device with a working replacement device.

Referring now back to decision block 138, if the analysis of abuse detection system 34 indicates that one or more of the sensors 38a'-38d' are in a tripped state, then it may be determined that the device 10 has been previously subjected to liquid abuse and is ineligible for repair or replacement under the terms of a warranty policy. At step 150, a self test routine may be performed to determine if the liquid abuse was severe enough to damage and/or render the device 10 inoperable. If at decision block 152, the returned device 10 passes the self test routine of step 150, then it may be concluded the abuse event experienced by the device 10 resulted in either no permanent damage or, at most, negligible damage insufficient to affect normal operation of the device 10. If this is the case, personnel servicing the device 10 may first reset any tripped sensors, as indicated by step 146, and then re-enable normal device operations, for example, by performing a master reset of the device 10, as illustrated by step 148. Returning to decision block 152, if the device 10 fails the self test routine of step 148, then it may be concluded that the liquid abuse event or events caused sufficient damage to render the device 10 inoperable. Furthermore, because the damage was determined to be the result of consumer abuse and thus not covered by a warranty, a product return request may be denied, as illustrated by step 154. For example, the personnel or technician servicing the device 10 may inform the consumer that the cause of failure of the device 10 is not covered under the warranty. At this point, the consumer may elect to pay the costs of any necessary repair services, or purchase a replacement product.

While the embodiment of the present invention illustrated by FIGS. 4A and 5A pertain to the detection of consumer abuse events involving liquid exposure to the device 10, it will be appreciated by those skilled in the art that other embodiments of the present invention may be adapted to detect various different types of consumer abuse events. For example, alternate embodiments of the present invention are illustrated in FIGS. 6-9, wherein blocks which perform essentially the same function in FIGS. 6-9 as those blocks in FIGS. 4A and 5A have been numbered with like reference numerals.

Figure 6:
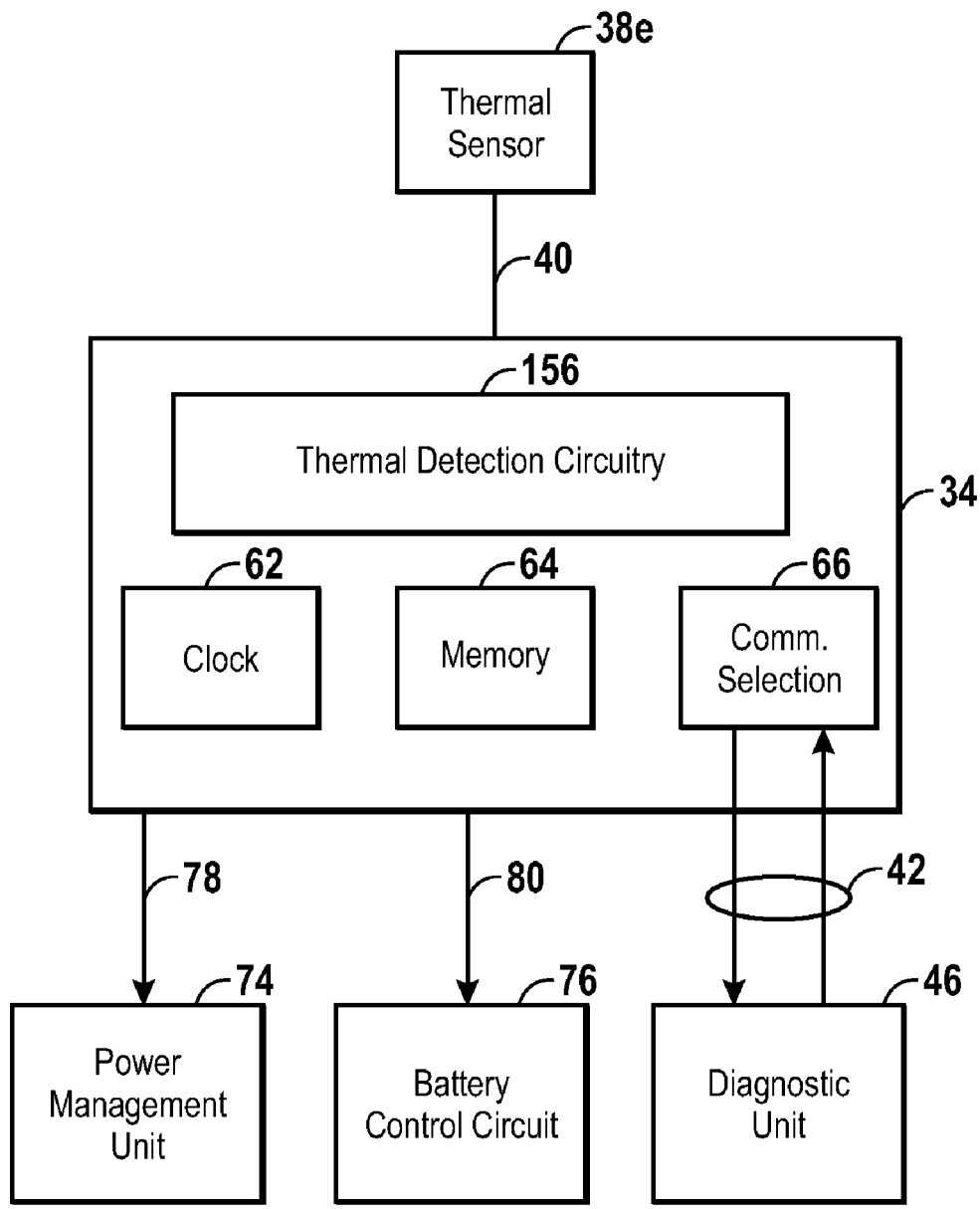
FIG. 6 is a block diagram illustrating a diagrammatical view of a consumer abuse detection system in accordance with a second embodiment of the present invention.

Referring now to FIG. 6, a second embodiment of the present invention is illustrated. In particular, the presently illustrated abuse detection system 34 of FIG. 6 is adapted to detect the occurrence of consumer abuse due to exposing a device 10 to extreme temperatures and may include thermal detection circuitry 156, as well as the above discussed clock 62, non-volatile storage 64, and communication selection block 66. A thermal sensor 38e may be electronically coupled to the abuse detection system 34 via the communication line 40. The thermal sensor 38e of the presently illustrated embodiment may be provided by a thermocouple, a thermistor, a negative temperature coefficient (NTC) resistor, or by any suitable device capable of sensing temperature.

In the presently illustrated embodiment, the thermal sensor 38e may be positioned either internally or externally with respect to the device 10. In an alternative embodiment, the thermal sensor 38e may be integrated with the abuse detection system 34 for gross temperature sensing. Further, although the illustrated embodiment depicts only a single thermal sensor 38e, it shall be appreciated by those skilled in the art, that additional thermal sensors may also be implemented and connected to the abuse detection system 34. However, depending on the size of the device 10, the use of multiple thermal sensors may be redundant. That is, assuming the device 10 is a small portable device, such as the portable media player of FIG. 1, exposing any part of the small portable device to extreme temperatures will generally affect the entire device uniformly, wherein a single sensor may be sufficient to monitor the thermal exposure. However, where the device 10 is a larger less portable device, then it may be desirable to utilize multiple sensors positioned in various locations throughout the device 10.

The thermal sensor 38e may operate in accordance with one or more temperature thresholds. For example, one threshold may be a high-temperature threshold for detecting if the device 10 is exposed to extremely high temperatures, such as leaving a device 10 in the sun for an extended period of time. Conversely, another threshold may be a low temperature threshold for detecting if the device 10 is exposed to extremely low temperatures. Further, in other embodiments, one thermal sensor may be used to detect high temperature exposure and another thermal sensor may be used to detect low temperature exposure. The thermal sensor 38e may be either internal to the device 10 for measuring internal temperature or may be external to the device 10 for measuring the surrounding temperature. Indeed, certain embodiments may encompass both internal and external thermal sensors.

In the illustrated embodiment, if the thermal sensor 38e detects that the temperature within the device 10 has exceeded the set threshold, the thermal sensor 38e may be configured to provide an indication to the thermal detection circuitry 156 that a thermal abuse event has occurred. As generally discussed above, such indication may be provided when the thermal abuse detection circuitry 156, while continuously monitoring the thermal sensor 38e, receives a measured thermal parameter from the thermal sensor 38e which exceeds a predetermined threshold. Further, the thermal sensor 38e itself may be configured to send an alarm signal to the thermal detection circuitry 156 indicating that the device 10 has been exposed to excessive temperature upon measuring a temperature which exceeds the predetermined threshold. In certain embodiments, the thermal sensor 38e may be configured to not only detect that a temperature threshold has been exceeded, but also that the threshold is exceeded for a certain predetermined amount of time before sending indication to the thermal detection circuitry 156. The objective of such embodiments is to filter or ignore events in which a device 10 is only exposed to a high temperature for a brief period, but not long enough that one would reasonably expect damage to occur in the device 10.

Upon receiving indication from the thermal sensor 38e, the thermal detection circuitry 156 may be configured to generate a data entry corresponding to the detected thermal abuse event. As described above, the data entry may be in the form of a timestamp (e.g. generated based on the clock 62) corresponding to the time that the thermal event was detected by the thermal sensor 38e and may be stored in a memory device 64, which, as discussed above, may be provided by any suitable non-volatile storage device (e.g. an EEPROM). The data entries may also include the operating state of the device 10 at the time the abuse event was detected. Further, in embodiments utilizing multiple thermal sensors, the data entry may also include an identification component which may be used for diagnostic purposes to identify which particular sensor or sensors detected the event.

Upon the detection of a thermal abuse event, the thermal detection circuitry 156 may also be configured to disable power to the device 10. As discussed above, this may be accomplished by sending disable signals to the power management unit 74 and the battery protection circuit 76 via communication lines 78 and 80, respectively. The thermal detection circuitry 156 may also be configured to place the abuse detection system 34 into a sleep mode and to initiate a wake-up timer, which may be timed by the clock 62, to periodically wake the abuse detection system 34 after a predetermined amount of time to determine whether the thermal abuse is still occurring. For example, upon waking, the thermal detection circuitry 156 may recheck the thermal sensor 38e to determine if currently detected temperatures still exceed the above discussed threshold(s) and, if it is determined that the detected temperatures exceed the acceptable threshold(s), the thermal detection circuitry 156 may be configured to place the abuse detection system 34 back into the sleep mode and to reinitiate the wake-up timer.

Alternatively, if upon waking, the abuse detection system 34 determines that the detected temperature does not exceed the threshold(s), the thermal detection circuitry 156 may instruct the device 10 to perform the above described self test function to determine the extent, if any, of damage that may have occurred due to the temperature exposure. If no damage is reported by the self test results, the device 10 may return to normal operation mode. However, if some damage or the possibility of damage is detected, then the user may be instructed to return the device to either the manufacturer or to the point of sale for servicing. Such servicing activities may include interfacing a diagnostic unit 64 with the device 10 through the communication selection block 66 via the dual-mode communication channel 42. This may enable a technician to analyze data stored in the non-volatile storage 64 and to determine whether a thermal abuse event occurred.

It should be further noted that the illustrated embodiment of FIG. 6 is not only useful for detecting external temperatures to which a device 10 is exposed, but may also be useful for detecting internal temperature events, such as when a user operates a device in such a manner that would subject it to possible thermal abuse. For example, some users may attempt to increase the bus speed of one or more processors in a device 10 in order to increase overall processing speeds to a level beyond what the device 10 may have been designed to operate. This is commonly referred to as "over-clocking." However, by increasing the bus speed of the processor, the heat output by the processor is usually increased proportionately. As such, the abuse detection system 34 of FIG. 6 may also be directed towards detecting these types of thermal abuse events, such as via an internal thermal sensor coupled to the processor.

Figure 7:
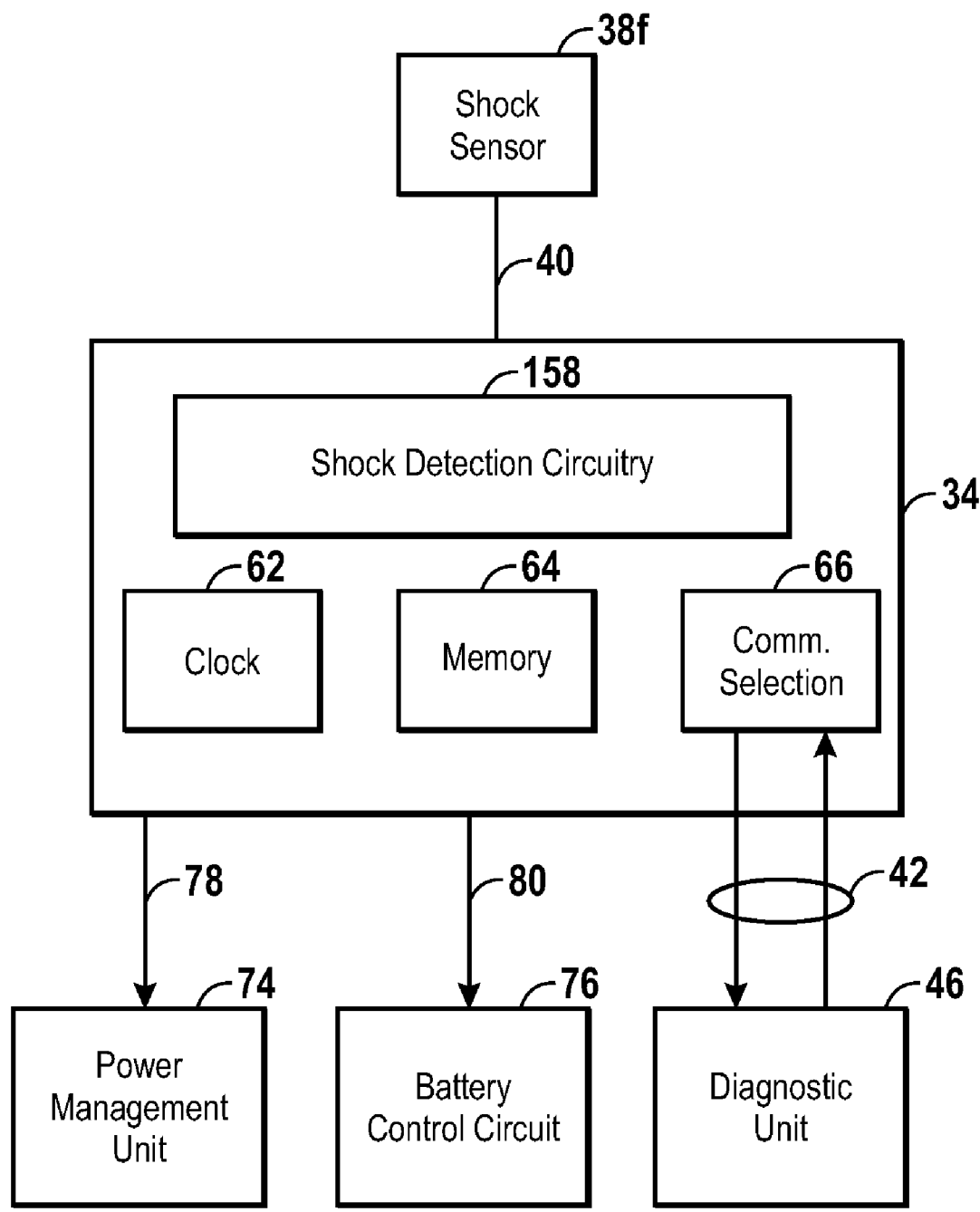
FIG. 7 is a block diagram illustrating a diagrammatical view of a consumer abuse detection system in accordance with a third embodiment of the present invention.

FIG. 7 illustrates a third embodiment of the abuse detection system 34 of the present invention which is adapted to detect consumer abuse events relating to excessive shock or drop events. The abuse detection system 34 of FIG. 7 may include shock detection circuitry 158, as well as the above discussed clock 62, non-volatile storage 64, and the communication selection block 66. A shock sensor 38f may be electronically coupled to the abuse detection system 34 via the communication line 40. In certain embodiments, the shock sensor 38f may be provided by any suitable device for measuring shock, movement, vibrations, and so forth. For example, the shock sensor 38f may be implemented via an accelerometer configured to measure vibrations or acceleration due to gravity. Additional types of shock sensors which may be used are described in U.S. patent application Ser. No. 11/725,008, entitled "Mounted Shock Sensor," filed Mar. 15, 2007, which is assigned to the assignee of the present invention, the disclosure of which is hereby incorporated herein by reference. Further, while a single shock sensor 38f is shown in the presently illustrated embodiment, other embodiments may include multiple shock sensors depending on the size, functions, and characteristics of the device 10.

The shock sensor 38f may be configured to operate based on a predetermined shock level threshold. A shock event may occur, for instance, when the device 10 impacts against the ground or any other object with a certain amount of force after being dropped by a user. For example, the shock sensor 38f may be configured to provide indication of the occurrence of a shock abuse event to the shock detection circuitry 158 if a sensed level of vibration (e.g. the device impacts the ground) exceeds a predetermined vibration threshold or if a sensed level of acceleration (e.g. the device 10 falling after being dropped) exceeds a predetermined acceleration threshold. Indeed, certain embodiments may include multiple types of shock sensors for detecting multiple types of shock events (e.g., vibration or acceleration).

Also, as discussed above, indication of the occurrence of a shock event may be provided when the shock detection circuitry 158. For example, while continuously monitoring the shock sensor 38f, the shock detection circuitry 158 may receive a measured shock parameter from the shock sensor 38f that exceeds the predetermined shock threshold. Additionally, the shock sensor 38f itself may be configured to send an alarm signal to the shock detection circuitry 158 indicating that the device 10 has been exposed to excessive shock or force upon measuring a shock parameter which exceeds the predetermined threshold. The thresholds upon which the shock sensor 38f operates may depend on the nature of the device 10. For example, where the device 10 is a relatively sensitive and fragile electronic device, such as a laptop computer, generally not designed to withstand substantial shock, the vibration and/or acceleration thresholds may be set relatively low so that the shock sensor 38f may detect and indicate the occurrence of consumer abuse even when small amounts of vibration or acceleration are detected. However, if the device 10 is designed to be more durable, such as solid-state memory-based media players, then the thresholds may be set to a higher (e.g., more tolerable) level.

In the illustrated embodiment, when the shock sensor 38f detects a shock event which exceeds a predetermined shock threshold, the shock sensor 38f may be configured to provide an indication to the shock detection circuitry 158 that a shock abuse event has occurred. Upon receiving indication from the shock sensor 38f, the shock detection circuitry 158 may be configured to generate a data entry corresponding to the detected shock abuse event. As described above, such data entries may be in the form of the timestamp, such as generated by the clock 62, corresponding to the time at which a shock event was detected by the shock sensor 38f. The data entries may also include the operating state of the device 10 at the time the abuse event was detected. The data entries may be stored in any suitable non-volatile storage device, such as indicated by reference numeral 64, for later use and analysis by a diagnostic unit 46. Further, in embodiments utilizing multiple shock sensors, the data entry may also include an identification component which may be used for diagnostic purposes to identify which particular sensor or sensors detected the event.

Upon the detection of a shock abuse event, the shock detection circuitry 158 may operate in a similar manner as the above discussed liquid detection circuitry 60 and thermal detection circuitry 156. That is, the shock detection circuitry 158 may be configured to temporarily disable power to both a power management unit 74 and a battery protection circuit 76, for example, by sending power disable signals to the power management unit 74 and the battery protection circuit 76 via communication lines 78 and 80 respectively.

The shock detection circuitry 158 may also be configured to place the abuse detection system into a sleep mode and to initiate a wake-up timer, which may be timed by the clock 62, to periodically wake the abuse detection system 34 after a predetermined amount of time in order to recheck the shock sensor 38*f* to determine if vibration or acceleration levels still exceed the above discussed threshold(s). This may be particularly useful if the device 10 is currently in an environment in which there is constant ongoing turbulent activity, such as when a user is carrying the device 10 while participating in rigorous physical activities. For example, if upon waking the abuse detection system 34, it is determined that acceleration and/or vibration levels are still above an acceptable threshold, then the shock detection circuitry 158 may be configured to place the abuse detection system 34 back into the sleep mode and to reinitiate the wake-up timer.

Alternatively, if upon waking from sleep mode, the shock detection circuitry 158 determines that the shock sensor 38*f* is indicating that detected vibration and/or acceleration activity is within acceptable levels, the shock detection circuitry 158 may instruct the device 10 may perform the above-discussed self test function to determine the extent, if any, of damage that may have occurred due to the shock event(s). If no damage is reported by the self test results, the device 10 may return to normal operation mode. However, if some damage or the possibility of damage is detected, then the user may be instructed to return the device to either the manufacturer or to the point of sale for servicing. As discussed above, servicing the device may include interfacing the diagnostic unit 46 with the device 10 through the above discussed communication selection block 66 via the dual-mode communication interface 42. This may allow for the reading and analysis of data stored in the non-volatile storage 64 to determine if and to what extent a shock abuse event or events occurred in the device 10.

A further type of consumer abuse which may be of interest is tampering, which may generally defined as including any sort of interaction with a device 10 which is not related to operating the device 10 in a normal manner. One type of tampering may occur when a user attempts to open or disassemble the device 10 to manipulate one or more components inside. For example, consumers may attempt to open a device housing (e.g., housing 12) to either add or remove components for various reasons, such as circumventing copyright protection and/or digital rights management (DRM) components. Tampering may also include attempted removal of one or more components of the abuse detection system 34, as described above.

Figure 8:
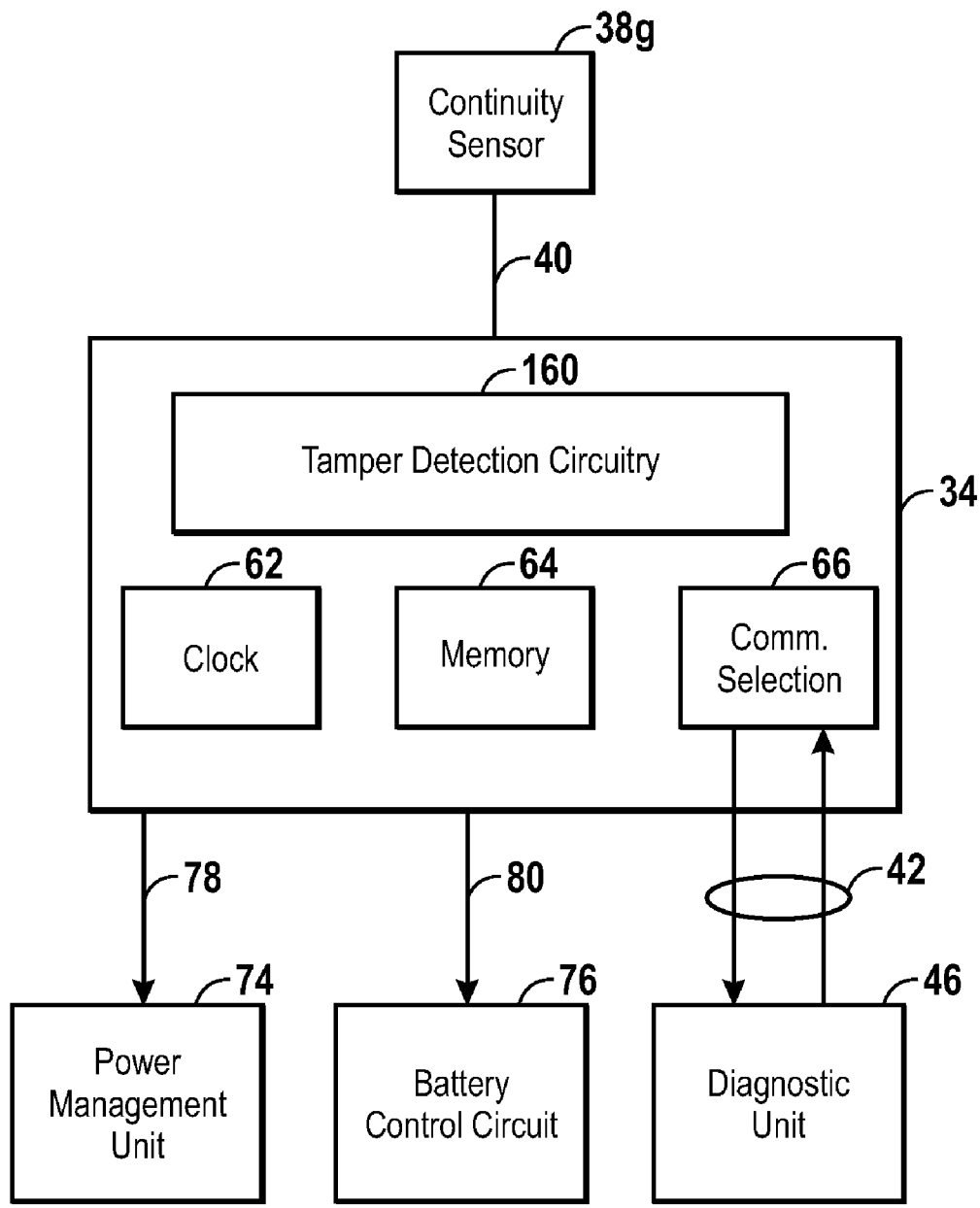
FIG. 8 is a block diagram illustrating a diagrammatical view of a consumer abuse detection system in accordance with a fourth embodiment of the present invention.

FIG. 8 illustrates yet another embodiment of the abuse detection system 34 of the present invention which is adapted to detect consumer abuse due to tampering with a device 10 in a manner unrelated to normal usage. The abuse detection system 34 of FIG. 8 may include tamper detection circuitry 160, as well as the above discussed clock 62, non-volatile storage 64, and communication selection block 66. A tamper detection mechanism, such as a continuity sensor 38*g*, may be electronically coupled to the abuse detection system via the communication line 40.

While the presently illustrated embodiment shows a single continuity sensor 38*g*, it should be understood that multiple continuity sensors may also be implemented in alternate embodiments. For example, it may be useful to place one or more continuity sensors at positions on or within the device by which users are most likely to attempt to open or tamper with the device 10, for example, along the edges of housing or casing structures of the device 10. The continuity sensor 38*g* may be configured to provide indication to the tamper detection circuitry 160 that tampering has occurred. As generally discussed above, such indication may be provided when the tamper detection circuitry 160, while continuously monitoring the continuity sensor 38*g*, detects that continuity across the continuity sensor 38*g* has been interrupted. Further, the continuity sensor 38*g* itself may be configured to send an alarm signal to the tamper detection circuitry 160 indicating that the device 10 has been tampered with upon detecting an interruption of continuity at sensor 38*g*. By way of example, continuity across the sensor 38*g* may be interrupted when a user attempts to open the housing 12 of the device 10.

Upon receiving indication from the continuity sensor 38*g*, the tamper detection circuitry 160 may be configured to generate a data entry corresponding to the detected tamper abuse event. As described above, such data entries may be in the form of a timestamp, such as generated by the clock 62, corresponding to the time at which interruption in continuity was detected by the continuity sensor 38*g*. The data entries may also include the operating state of the device 10 at the time the abuse event was detected. Further, the data entries may be stored in the memory 64, which may be provided by any suitable non-volatile storage device. Moreover, in embodiments utilizing multiple continuity sensors, the data entry may also include an identification component, as discussed above, which may be used for diagnostic purposes to identify which particular continuity sensor detected tampering.

Upon detection of a continuity interruption corresponding to a tamper abuse event, the tamper detection circuitry 160 may operate in a similar manner as the above discussed detection circuitries of FIGS. 4A, 5A, 6, and 7. That is, the tamper detection circuitry 160 may be configured to disable power to both a power management unit 74 and a battery protection circuit 76 by sending disable signals to the power management unit 74 and the battery protection circuit 76 via communication lines 78 and 80, respectively. The tamper detection circuitry 160 may also be configured to place the abuse detection system 34 into a sleep mode and to initiate a wake-up timer, which may be timed by clock 62, to periodically wake the abuse detection system 34 after a predetermined amount of time.

Upon waking from sleep mode, the tamper detection circuitry 160 may recheck the continuity sensor 38*g* to determine if continuity interruptions are still present and occurring. If it is determined that one or more continuity interruptions are still present, then the tamper detection circuitry 160 may be configured to place the abuse detection system 34 back into the sleep mode, at which point the wake-up timer is reinitiated. If the tamper detection circuitry 160 determines that the continuity sensor 38*g* detects no continuity interruptions, the device 10 may be instructed to perform the above-discussed self test function to determine whether any damage has resulted from the detected tamper event. If no damage is reported by the self test results, the device 10 may return to normal operation mode. However, if some damage or the possibility of damage is detected, then the user may be instructed to return the device 10 to either the manufacturer or to the point of sale for servicing. As discussed above, servicing the device may include interfacing the diagnostic unit 46 with the device 10 through the provided communication selection block 66 via the dual-mode communication interface 42. This may allow for the reading and analysis of tamper abuse event data stored in the memory 64 and determination of if and to what extent continuity interruptions related to tampering occurred in the device 10.

It should be noted that each of the embodiments illustrated in FIG. 4A and FIGS. 6-8 may be separately implemented in a device 10, such that the device 10 includes one of each type of the above discussed abuse detection systems. Moreover, it is also possible to combine the features of the above discussed embodiments to implement a single abuse detection system 34 including multiple types of sensors for detecting multiple types of abuse events. For example, referring now to FIG. 9, a further embodiment of the present invention is illustrated utilizing the liquid detection sensors 38a-38d of FIG. 4A, the thermal sensor 38e of FIG. 6, the shock sensor 38f of FIG. 7, and the continuity sensor 38g of FIG. 8. The abuse detection system 34 illustrated in FIG. 9 also includes abuse detection circuitry 162 which may incorporate all the functionalities described above with regard to the liquid detection circuitry 66, the thermal detection circuitry 156, the shock detection circuitry 158, and the tamper detection circuitry 160.

Figure 9:
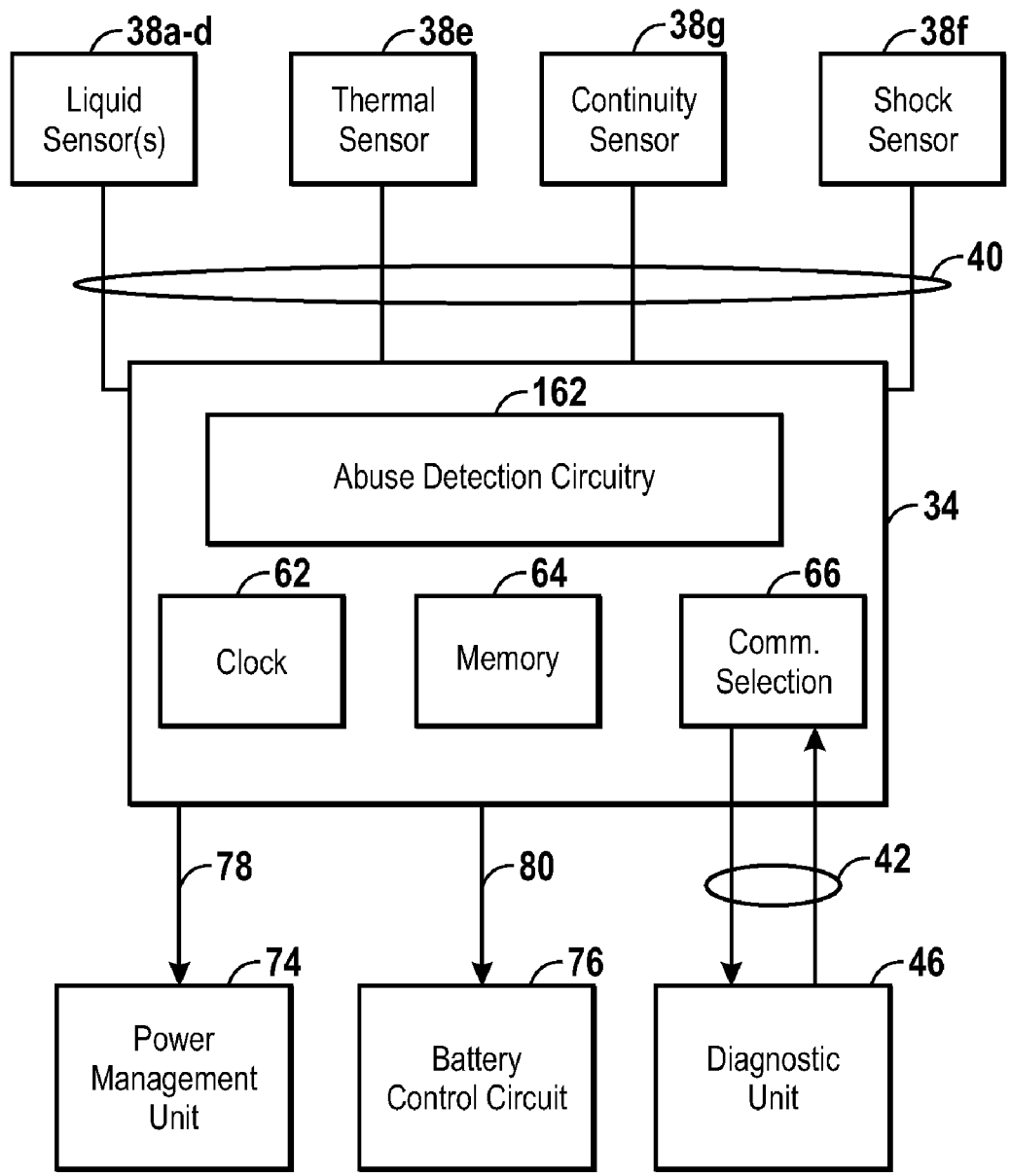
FIG. 9 is a block diagram illustrating a diagrammatical view of a consumer abuse detection system in accordance with a fifth embodiment of the present invention.

The abuse detection sensors 38a-38g may each be electronically coupled to the abuse detection system 34 of FIG. 9 via respective communication lines 40. Upon detection of an abuse event by any of the sensors 38a-38g, a corresponding indication of the abuse event may be provided to the abuse detection circuitry 34 via the communication lines 40. Upon receiving such indication, the abuse detection circuitry 162 may be configured to generate a data entry, such as in the form of a timestamp as discussed above. In addition, the data entries may include the operating state of the device 10 at the time the abuse event was detected. In some embodiments, particularly those utilizing multiple sensors, the data entry may further include an identification component which may be used for diagnostic purposes to identify which particular sensor detected the event, as well as what type of abuse event was detected.

The above described sleep/wake and self test procedures may be implemented in a similar, if not identical manner as discussed above in FIG. 4A, and FIGS. 6-8. Furthermore, a diagnostic unit 46 may be interfaced with the device 10, such as via the above discussed I/O port 18. The provided communication selection block 66 may allow, such as via the dual-mode communication channel 42, the reading and analysis of historical abuse event data stored in a non-volatile memory 64 and, based on the abuse event data stored therein, the diagnostic unit 46 may determine if and to what extent consumer abuse has occurred in the device 10.

One key benefit provided by the embodiments described herein is the capability to determine whether or not consumer abuse has occurred in a given device. This is particularly useful when considered alongside warranty and guarantee policies which are important aspects in the sale of products. As discussed above, warranties are meant to provide an acknowledgment by the manufacturer or vendor that a given device is being sold free from defects. However, if a consumer later discovers that the device does indeed have a defect, the manufacturer or vendor, under the terms of the warranty policy, will generally replace or repair the device 10 at little or no charge to the consumer. Warranty policies, however, generally exclude, often explicitly, damage or failure due to consumer abuse. Therefore, aspects of the present invention are particularly useful when a consumer returns a product knowing that the failure is due to damage caused by consumer abuse, whether the abuse is intentional or not, but attempts to pass off the return as a defect of manufacture.

Figure 10:
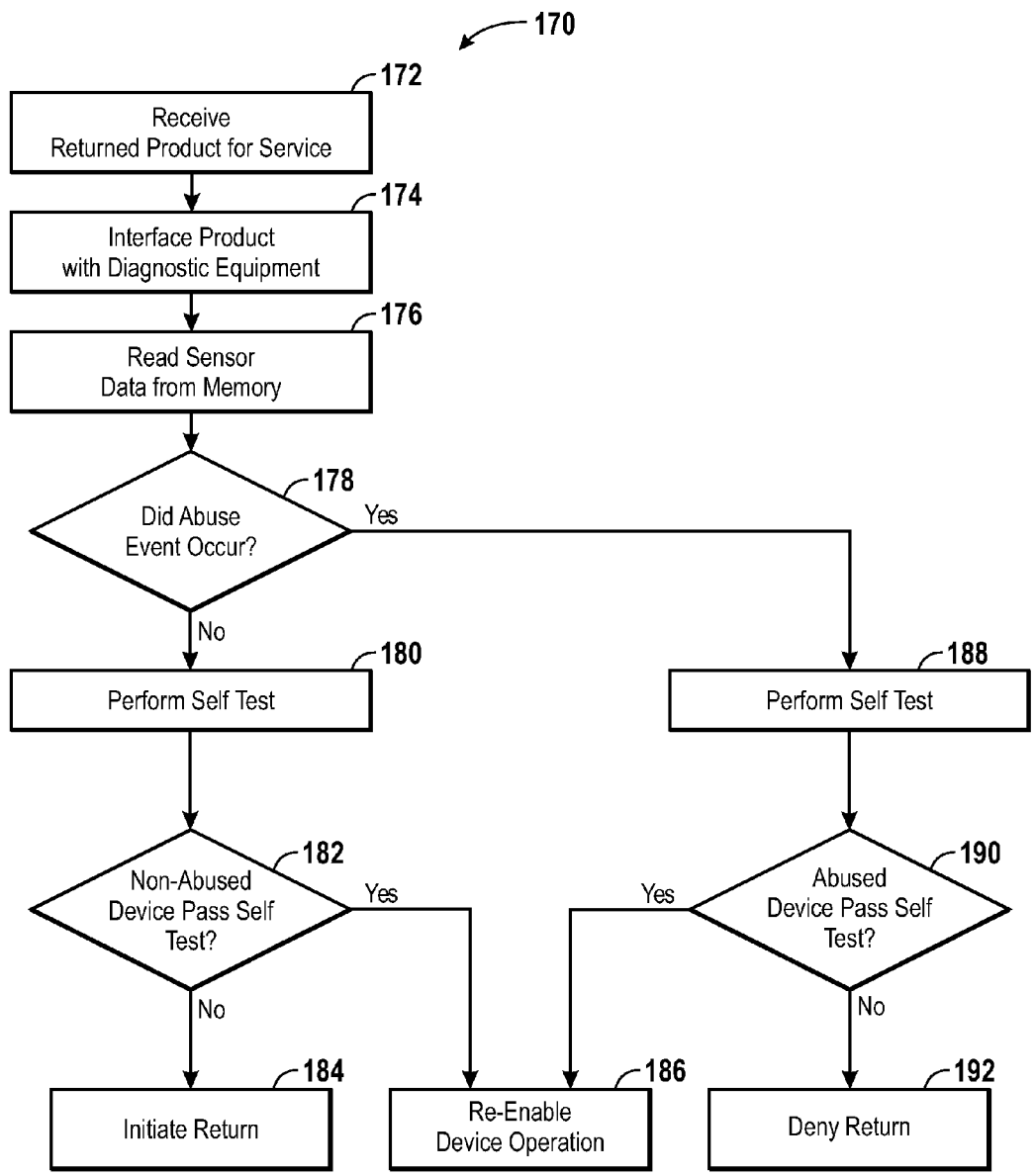
FIG. 10 is a flow chart illustrating an alternative method for determining whether to initiate a product return in accordance with one embodiment of the present invention.

Turning now to FIG. 10, an exemplary method 170 for analyzing and diagnosing an allegedly "defective" product returned by a consumer and determining whether to initiate a product return is illustrated. The method 170 is initiated at step 172 when a product is returned by the consumer to either the manufacturer or the vendor at the point of sale for service. The returned product may be a device incorporating any aspect of the invention illustrated in the above discussed embodiments, as well as any other suitable variation discussed herein.

At step 174, the device 10 is interfaced with diagnostic equipment. As discussed above, diagnostic equipment, such as diagnostic unit 46, may be interfaced with the device 10 via one or more I/O ports 18. The diagnostic equipment may be configured to communicate with the device 10, for example, via a the dual-mode communication channel 42, in order to access a memory device within the device 10, such as the non-volatile storage 64, to analyze abuse event data collected by any of the above described sensor devices 38a-38g. For example, as illustrated by step 176, abuse event data detected by the sensors 38a-38g may be read from the memory device 64 and analyzed at decision block 178 to determine whether any abuse events occurred prior to the device 10 being returned for service.

If the diagnosis indicates that no abuse has occurred, then it may be inferred that the cause of the device malfunction or failure may have been due to a manufacturing defect which would possibly be covered by a warranty policy. If it is determined so, then personnel servicing the device 10 may first initiate a self test routine, as illustrated at step 180, to determine the extent, if any, of damage present in the returned device 10. If at decision block 182, the returned device passes the self test routine of step 180, then it may be concluded that the device 10 has experienced either no damage or, at most, negligible damage that is insufficient to affect normal operation of the device 10. If this is the case, personnel servicing the device 10 may re-enable normal device operations, for example, by performing a master reset of the device 10, as illustrated by step 186, and return the device 10 to the consumer. Returning to decision block 182, if the device 10 fails the self test routine of step 180, a product return may be initiated under the terms of an appropriate warranty policy as depicted by step 184, the method 170 ending thereafter. It should be understood that the term "return" as used herein may include both repairing and/or restoring the returned device 10 to working order, as well as exchanging the returned device with a working replacement device, which may be either brand new or, in some cases, refurbished.

Referring back to step 178, if the analysis of the abuse event data stored in the memory 64 of the device 10 indicates that one or more abuse events have occurred prior to receiving the returned device 10, then the returned device 10 would be ineligible for repair or replacement under the terms of a warranty policy. Further, if it is determined that abuse has occurred, personnel servicing the device 10 may first determine whether the abuse was severe enough to cause damage and/or render the device 10 inoperable. For example, a technician may first perform a self test routine, as illustrated by step 188, to determine the extent of damage present in the returned device 10, if any. If at decision block 190, the returned device passes the self test routine of step 188, then it may be concluded the abuse event the device 10 experienced resulted in either no permanent damage or, at most, negligible damage insufficient to affect normal operation of the device 10 (e.g., cosmetic or aesthetic damage to a device housing). If this is the case, personnel servicing the device 10 may re-enable normal device operations, for example, by performing a master reset of the device 10, as illustrated by step 186. Returning now to decision block 190, if the device 10 fails the self test routine of step 188, then it may be concluded that the abuse event or events caused sufficient damage to render the device inoperable. Furthermore, because the damage was determined to be the result of consumer abuse, and thus not covered by a warranty, a product return request may be denied, as illustrated by step 192. For example, the personnel or technician servicing the device 10 may inform the consumer that the cause of failure of the device 10 is not covered under the warranty. At this point, the consumer may elect to pay the costs of any necessary repair services, or purchase a replacement product.

It should be noted that the diagnostic step 178 described in the method 170 may vary depending on the returned product and depending on where the product is returned. For example, if the product is returned to a point of sale, the sales representatives may lack the technical skills or may not be trained to analyze the abuse event data stored on the device to a high degree of detail as to determine what degree of abuse occurred, which sensors detected the abuse, and so forth. As such, diagnostic equipment used at the point of sale may be relatively simple and connect to the device solely to indicate a "yes" or "no" equivalent response indicating whether consumer abuse has or has not occurred. However, if the returned product is of a more complex design that is normally returned directly to a manufacturer for servicing, such as laptop computers, televisions, or the like, diagnostic equipment may be more sophisticated and enable technicians analyzing the device failure(s) to determine not only if abuse occurred, but also, for example, which sensors detected the abuse, which sensor was the initial sensor to detect the abuse, how long or how frequently abuse occurred, and so forth.

While the presently disclosed invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A system for detecting consumer abuse in an electronic device, the system comprising:
   one or more sensors configured to detect an occurrence of an abuse event;
   abuse detection circuitry configured to receive indication of the occurrence of the abuse event from the one or more sensors and to generate a record corresponding to the occurrence of the abuse event upon receiving the indication;
   a memory device configured to store the record; and
   an interface configured to facilitate communication between the electronic device and an external device;
   wherein the abuse detection circuitry is further configured to, upon receiving the indication of the occurrence of the abuse event, disable the electronic device and enter into a standby mode, to return from the standby mode after a predetermined amount of time and, upon returning from the standby mode, to determine if any of the one or more sensors still indicate the occurrence of the abuse event and, if any of the one or more sensors still indicate the occurrence of the abuse event, to return to the standby mode for the predetermined amount of time or else, if none of the one or more sensors indicate the occurrence of the abuse event, to re-enable the electronic device.

2. The system of claim 1, wherein the abuse event detected by the one or more sensors includes at least one of a liquid ingress event, a thermal event, a shock event, and a tamper event.

3. The system of claim 1, wherein the record generated by the abuse detection circuitry includes a timestamp generated by a clock device, the timestamp indicating a time value corresponding to when the abuse event was detected.

4. The system of claim 3, wherein the record further includes at least one of data identifying which of the one or more sensors detected the occurrence of the abuse event and data indicating the state of the electronic device at the time the abuse event was detected.

5. The system of claim 1, wherein the abuse detection system is further configured, upon re-enabling the electronic device, to initiate a self test to detect the presence of damage in the electronic device and, if the self test detects the presence of damage, to notify a user to obtain service for the electronic device.

6. The system of claim 1, wherein the interface is configured to provide two or more modes of communication between the electronic device and the external device, wherein the two or more modes include a first and a second communication mode.

7. The system of claim 6, further comprising:
   communication selection circuitry configured to select the first communication mode if the external device is a diagnostic device or to select the second communication mode if the external device is a non-diagnostic device;
   wherein the diagnostic device is configured to access and interpret the record stored in the memory device.

8. The system of claim 7, wherein accessing the record stored in the memory device is restricted by at least one means of authentication.

9. A system for detecting consumer abuse in an electronic device, the system comprising:
   one or more sensors each configured to indicate a sensor state, wherein the sensor state is one of a normal state or a tripped state, wherein each of the one or more sensors is configured to indicate a normal state if no abuse event is detected and to transition to the tripped state upon detecting the occurrence of an abuse event;
   abuse detection circuitry configured to monitor the state of each of the one or more sensors;
   an interface configured to facilitate communication between the electronic device and an external device, wherein the interface is configured to provide two or more modes of communication between the electronic device and the external device, wherein the two or more modes include a first and a second communication mode; and
   communication selection circuitry configured to select the first communication mode if the external device is a diagnostic device and to select the second communication mode if the external device is a non-diagnostic device, wherein the diagnostic device is configured to read the state of each of the one or more sensors.

10. The system of claim 9, wherein the abuse detection circuitry is further configured to disable the electronic device if any of the one or more sensors indicates the tripped state.

11. The system of claim 10, wherein the abuse detection circuitry is further configured, subsequent to disabling the electronic device, to notify a user to obtain service for the electronic device.

12. The system of claim 9, wherein each of the one or more sensors, after transitioning to the tripped state, are capable of being reset to the normal state.

13. A circuit board comprising:
one or more sensors configured to detect the occurrence of an abuse event in an electronic device;
abuse detection logic configured to disable the electronic device and enter into a standby mode if any of the one or more sensors indicates the occurrence of the abuse event, each of the one or more sensors being electronically coupled to the abuse detection logic, to return from the standby mode after a predetermined amount of time and, upon returning from the standby mode, to determine if any of the one or more sensors still indicate the occurrence of the abuse event and, if any of the one or more sensors still indicate the occurrence of the abuse event, to return to the standby mode for the predetermined amount of time or else, if none of the one or more sensors indicate the occurrence of the abuse event, to re-enable the electronic device; and
an input and output port configured to interface the circuit board with a diagnostic device.

14. The circuit board of claim 13, wherein the one or more sensors includes a plurality of sensors generally positioned along at least one edge of the circuit board.

15. The circuit board of claim 13, further comprising a memory device, wherein the abuse detection logic is configured to generate and store a record of the abuse event into the memory device.

16. An electronic device comprising:
a processor configured to execute instructions;
a storage device configured to store data, the data at least partially comprising instructions to be executed by the processor;
a user interface configured to receive data for use by the processor from a user; and
an abuse detection system comprising:
one or more sensors configured to detect the occurrence of an abuse event;
abuse detection circuitry configured to disable the electronic device if any of the one or more sensors indicates the occurrence of the abuse event;
an interface configured to facilitate communication between the electronic device and an external device, wherein the interface is configured to provide two or more modes of communication between the electronic device and the external device, wherein the two or more modes include a first and a second communication mode; and
communication selection circuitry configured to select the first communication mode if the external device is a diagnostic device and to select the second communication mode if the external device is a non-diagnostic device, wherein the diagnostic device is configured to read the state of each of the one or more sensors.

17. The electronic device of claim 16, wherein the abuse detection system further comprises a memory device, wherein if any of the one or more sensors detects the occurrence of the abuse event, the abuse detection circuitry is further configured to generate and store a record corresponding to the detected abuse event into the memory device, and wherein the diagnostic device accesses and interprets the record stored in the memory device.

18. A method for operating an electronic device, the method comprising the acts of:
detecting the occurrence of an abuse event; generating a record of the abuse event; storing the record; disabling the electronic device; determining if the abuse event is still occurring; and
re-enabling the electronic device if it is determined the abuse event is no longer occurring;
wherein re-enabling the electronic device includes first performing a self test to detect the presence of damage in the electronic device and, if the self test indicates the presence of damage, notifying a user to obtain service for the electronic device.

19. The method of claim 18, wherein the abuse event includes at least one of a liquid ingress event, a thermal event, a shock event, or a tamper event.

* * * * *